United States Patent
Wu et al.

[11] Patent Number: 5,900,733
[45] Date of Patent: * May 4, 1999

[54] WELL LOGGING METHOD AND APPARATUS FOR DETERMINING DOWNHOLE BOREHOLE FLUID RESISTIVITY, BOREHOLE DIAMETER, AND BOREHOLE CORRECTED FORMATION RESISTIVITY

[75] Inventors: Peter T. Wu, Sugar Land; Jacques R. Tabanou, Houston, both of Tex.

[73] Assignee: Schlumberger Technology Corporation, Sugar Land, Tex.

[21] Appl. No.: 08/789,902

[22] Filed: Jan. 29, 1997

Related U.S. Application Data

[60] Provisional application No. 60/011,275, Feb. 7, 1996.

[51] Int. Cl.$^6$ ................................ G01V 3/08; G01V 3/10
[52] U.S. Cl. ............................................. 324/338; 702/11
[58] Field of Search ........................... 324/333, 338, 324/339, 324, 334, 343; 702/6, 7, 10, 11, 12, 13

[56] References Cited

U.S. PATENT DOCUMENTS

| | | | |
|---|---|---|---|
| 3,305,771 | 2/1967 | Arps | 324/342 |
| 3,551,797 | 12/1970 | Gouilloud et al. | 324/338 |
| 3,849,721 | 11/1974 | Calvert | 324/338 |
| 4,107,597 | 8/1978 | Meador et al. | 324/341 |
| 4,185,238 | 1/1980 | Huchital et al. | 324/338 |
| 4,209,747 | 6/1980 | Huchital | 324/338 |
| 4,278,941 | 7/1981 | Freedman | 324/341 |
| 4,300,098 | 11/1981 | Huchital et al. | 324/338 |
| 4,451,789 | 5/1984 | Meador | 324/338 |
| 4,468,623 | 8/1984 | Gianzero et al. | 324/367 |
| 4,511,843 | 4/1985 | Thoraval | 324/338 |
| 4,538,109 | 8/1985 | Clark | 324/338 |
| 4,553,097 | 11/1985 | Clark | 324/338 |
| 4,567,759 | 2/1986 | Ekstrom et al. | 324/355 |
| 4,622,518 | 11/1986 | Cox et al. | 324/341 |
| 4,626,785 | 12/1986 | Hagiwara | 324/339 |
| 4,678,997 | 7/1987 | Janes | 324/344 |
| 4,692,706 | 9/1987 | Mazzagatti et al. | 324/338 |
| 4,730,161 | 3/1988 | Cox et al. | 324/338 |
| 4,766,384 | 8/1988 | Kleinberg et al. | 324/338 |
| 4,785,247 | 11/1988 | Meador et al. | 324/338 |
| 4,899,112 | 2/1990 | Clark et al. | 324/338 |
| 4,968,940 | 11/1990 | Clark et al. | 324/338 |
| 5,081,419 | 1/1992 | Meador et al. | 324/338 |
| 5,210,495 | 5/1993 | Hapashy et al. | 324/338 |

(List continued on next page.)

OTHER PUBLICATIONS

Clark, B. et al., "A Dual Depth Resistivity Measurement for FEWD", SPWLA 29th Annual Loggin Symposium (1988), Paper A. Month Unavailable.

Clark, B. et al., "Electromagnetic Propagation Logging While Drilling: Theory and Experiment", SPE Paper 18117 presented at 63rd Annual Technical Conference and Exhibition, Houston, Texas, Oct. 2–5, 1988.

(List continued on next page.)

*Primary Examiner*—Jay M. Patidar
*Attorney, Agent, or Firm*—Martin Novack; Wayne I. Kanak

[57] ABSTRACT

A well logging method and apparatus are disclosed for determining borehole corrected formation resistivity, borehole diameter, and downhole borehole fluid (mud) resistivity with improved accuracy. A logging device in the borehole transmits electromagnetic energy from a transmitter, which energy is received at receivers on the logging device. The phase and amplitude of the received energy are measured at the receivers and a phase shift, phase average, and attenuation are associated with the transmitter-to-receivers spacing. The process is then repeated for a plurality of further transmitters having different spacings from the receivers. A formation and borehole model having model values of borehole corrected formation resistivity, borehole diameter, and borehole fluid resistivity is generated. Values of borehole corrected formation resistivity, borehole diameter, and borehole fluid resistivity that would produce a model phase shift, phase average and attenuation corresponding to the measured values of these parameters are then determined.

47 Claims, 23 Drawing Sheets

U.S. PATENT DOCUMENTS

| | | | |
|---|---|---|---|
| 5,278,507 | 1/1994 | Bartel et al. | 324/335 |
| 5,345,179 | 9/1994 | Habashy et al. | 324/338 |
| 5,361,239 | 11/1994 | Zoeller | 324/338 |
| 5,389,881 | 2/1995 | Bittar et al. | 324/338 |
| 5,434,507 | 7/1995 | Beren et al. | 324/338 |
| 5,594,343 | 1/1997 | Clark et al. | 324/338 |

OTHER PUBLICATIONS

Golub and Van Loan, *Matrix Computions,* Section 2.3, Johns Hopkins University Press, (1985), pp. 16–20. Month Unavailable.

Anderson, B. and Chew, W.C., "A New High Speed Technique For Calculating Synthetic Induction and DPT Logs,"SPWLA 25th Annual Loggin Symposium (1984), Paper HH. Jun. 10–13, 1984.

Morse, P. and Feshbach, H., Chapter 8: Interal Equations, *Methods of Theoretical Physics,* McGraw–Hill, New York, 1953, pp. 896–997.

Kong, Jin Au, *Electromagnetic Wave Theory,* Wiley–Interscience, 1986, pp. 120–182.

WELL LOGGING METHOD AND APPARATUS FOR DETERMINING DOWNHOLE BOREHOLE FLUID RESISTIVITY, BOREHOLE DIAMETER, AND BOREHOLE CORRECTED FORMATION RESISTIVITY

CROSS-REFERENCE TO RELATED APPLICATION

This application claims priority from U.S. Provisional Application 60/011,275, filed Feb. 7, 1996, which is incorporated herein by reference.

BACKGROUND OF THE INVENTION

1. Field of the Invention

This invention relates to the field of well logging and, more particularly, to well logging techniques and apparatus for determining formation properties, such as borehole compensated resistivity, and also for determining borehole diameter and borehole fluid resistivity with improved accuracy. The invention has general application in the well logging art, but is especially useful in measurement-while-drilling.

2. Description of the Related Art

A commonly used technique for evaluating formations surrounding an earth borehole is resistivity logging. Porous formations having high resistivity generally indicate the presence of hydrocarbons, while porous formations with low resistivity are generally water saturated. However, the region immediately surrounding the borehole can be invaded by borehole fluid or mud filtrate and have a different resistivity than the virgin formation. If a resistivity logging device has only one radial depth of investigation, there is limited ability to measure resistivity of all zones of interest, and there may be difficulty in determining if the measured resistivity represents the invaded zone, the virgin zone, or some combination of the two zones. However, if the resistivity logging device has multiple radial depths of investigation, there is greater flexibility. In addition to the advantage of having, for example, a shallow measurement and a deep measurement individually, the combination of the two can provide additional information such as the extent of invasion. It is also possible to combine two or more measurements, for example a shallow measurement and a deeper measurement, to compute a better extimate of the true formation resistivity. Another related factor, to be discussed further below, is the effect of the borehole itself on measurements.

Wireline resistivity logging tools have long been provided with two or more radial depths of investigation. Conventional wireline resistivity logging tools typically achieve two depths of investigation by using a short and a long vertical array of electrodes or coils. In general, a long vertical array provides a greater radial depth of investigation than does a short vertical array. More recently, as will be discussed below, measurement-while-drilling tools have been provided with multiple radial depths of investigation.

A type of well logging which is of interest herein is so-called electromagnetic propagation logging, which can be used to measure the resistivity of the formation surrounding a borehole. For example, U.S. Pat. No. 3,551,797 describes a technique wherein electromagnetic energy is transmitted into the formation, and energy which returns to the borehole is measured at a receiver pair to determine the attenuation and/or the phase shift of the electromagnetic energy propagating in the formation. More than one vertical spacing between a transmitter and different receiver pairs may be used to obtain different radial depths of investigation. For example, a receiver pair relatively close to the transmitter can be used to obtain attenuation and/or phase shift information from which the properties of the invaded zone are determined, and measurements of the attenuation and/or phase shift from a receiver pair relatively far from the transmitter can be used to obtain the properties of the deeper uninvaded formations. Either attenuation or phase shift can be used to determine a bulk value of the electromagnetic skin depth for the formation, with the bulk conductivity then being determinable from the electromagnetic skin depth.

Various other techniques also exist in the art for utilizing multiple transmitters and/or receivers to investigate resistivity at different depths of investigation.

In U.S. Pat. No. 4,899,112 there is disclosed a logging apparatus for determining the resistivity of formations at two different radial depths of investigation using signals received at a single receiver pair. The resistivity of formations at a relatively shallow depth of investigation around the receiver pair is determined as a function of the phase shift measured at the receiver pair, and the resistivity of formations at a relatively deep depth of investigation around the receiver pair is determined as a function of the attenuation measured at the receiver pair. The apparatus is particularly advantageous for measurement-while-drilling, where it is desirable to obtain resistivity at multiple depths of investigation while minimizing the length and complexity of the logging device. The '112 Patent also discloses a so-called borehole compensated embodiment, where the receiver pair is located between and equally spaced from, a pair of transmitting antennas that can be alternately energized. The signals received at the receiver pair can be averaged to obtain borehole compensated signals; i.e., signals from which (1) drift of electronic components, and (2) borehole rugosity, have been reduced or removed by cancellation.

U.S. Pat. No. 4,899,112 also discloses that the phase shift imbalance (the difference in phase shift for upward and downward propagating signals) and/or the attenuation imbalance (the difference in attenuation for upward and downward propagating signals) can be used in obtaining a differential borehole caliper and, in some circumstances, a borehole caliper. The '112 Patent further indicates that a mathematical model could be used to relate the phase shift imbalance and the amplitude imbalance to the change in borehole diameter, and that, for example, the specific geometry of the tool, the size and shape of the borehole, and the properties of the mud and formation can be included in the mathematical model and in a look-up table. The '112 Patent also observes that a caliper look-up table can also be generated by performing an experiment wherein the phase shift imbalance and the attenuation imbalance are measured as a tool is moved through a borehole with a stepped diameter.

One or more additional transmitters can be added to the type of logging device described in U.S. Pat. No. 4,899,112, at different spacing(s), to attain further depths of investigation. In U.S. Pat. No. 5,594,343, assigned to the same assignee as the present application, there is disclosed a logging apparatus that can be utilized in measurement-while-drilling, and which has three or more transmitting antennas and a pair of receiving antennas. In one disclosed embodiment of the '343 Patent, there are five transmitters; that is, fifth, third, first, second, and fourth transmitting antennas longitudinally spaced on a logging device in the recited sequence. A pair of longitudinally spaced receiving antennas are located between the first and second transmitting antennas. The fifth, third, first, second, and fourth transmitting antennas are spaced from the midpoint between the receiver pair by fifth, third, first, second, and fourth distances, respectively, and each of the fifth, third, first, second, and fourth distances are different. The transmitting antennas can be individually energized, and the configuration can provide the advantages of borehole compensation without the need for having, for each transmitter to receiver pair spacing, an "equal and opposite" transmitter with the same spacing on the other side of the receiver pair.

The geometry of the borehole and the properties of the borehole fluid (also called mud herein) can be important in the determination of formation resistivity, since correction should be made for the effect of the borehole fluid on the electromagnetic energy being used to measure formation properties. The mud resistivity can generally be measured uphole with good accuracy, but the downhole mud resistivity can be affected by various factors including temperature and mixing of the mud with formation fluids. The extent of such mixing in a given zone may or may not be estimable from local geological knowledge. The borehole geometry may also be roughly approximated from the drill bit size, but can vary substantially in different types of formations.

In wireline applications it may be practical to obtain a measure of borehole geometry with a caliper tool and/or to sample or otherwise measure downhole borehole fluid. In logging-while-drilling, however, these types of measurements are not readily available. Also, the types of computed differential caliper or computed caliper presently known can be improved upon.

It is among the objects of the present invention to provide an improved well logging technique and apparatus, that can be used in logging-while-drilling, for determining downhole borehole fluid resistivity, borehole diameter, and borehole corrected formation resistivity of formations surrounding an earth borehole, and for generating logs thereof.

SUMMARY OF THE INVENTION

The technique and apparatus of the present invention is useful in determining, with improved efficiency and accuracy, borehole corrected formation resistivity, downhole mud resistivity, and borehole diameter, and can advantageously be employed in measurement-while-drilling. (In the present application, any references to the determination or use of resistivity are intended to generically mean conductivity as well, and vice versa. These quantities are reciprocals, and mention of one or the other herein is for convenience of description, and not intended in a limiting sense. Also, the term "borehole diameter" is commonly used in well logging to express a measure of the borehole cross-sectional area in a particular longitudinal region of the borehole. It will be understood that a borehole region is typically not of cylindrical shape and that the term "borehole diameter" is used herein in the common well logging sense.)

The amplitude and phase measured at a single receiver produce relatively shallow measurements and are sensitive to the near borehole media. For this reason, the basic measurements of electromagnetic propagation logging tools are usually phase shift and attenuation across a receiver pair, the differential nature of these measurements tending to cancel most of the near borehole effects, and to reduce the contribution of the borehole fluid to the measurements.

The averaged phase at the receivers of a receiver pair is more sensitive than the phase shift to the near borehole conductivity. In an embodiment of the present invention, averaged phase at the receivers is used, together with phase shift and attenuation, in implementing an inversion to obtain modeling parameters.

In accordance with an embodiment of the method of the invention, there is disclosed a technique for determining the downhole borehole fluid resistivity, borehole diameter, and borehole corrected formation resistivity of formations surrounding an earth borehole, comprising the following steps: (a) suspending a logging device in the borehole; (b) transmitting electromagnetic energy from a transmitter location on the logging device, receiving the transmitted electromagnetic energy at receiver locations on the logging device, and measuring the phase and amplitude of the received electromagnetic energy for a first transmitter-to-receivers spacing associated with the transmitter and receiver locations; (c) determining, from the phase and amplitude measured at the receivers, a phase shift $PS_m$, a phase average $PA_m$, and an attenuation $AD_m$ associated with the first transmitter-to-receivers spacing; (d) repeating steps (b) and (c) for a plurality of further transmitter-to-receivers spacings to obtain $PS_m$, $PA_m$, and $AD_m$ for the plurality of further transmitter-to-receivers spacings; (e) generating a formation and borehole model having model values of borehole diameter HD, borehole fluid resistivity $r_m$, and borehole corrected formation resistivity $r_t$; (f) selecting values of HD, $r_m$ and $r_t$ that would produce a model phase shift PS, a model average phase PA, and a model attenuation AD that correspond, for each of the transmitter-to-receivers spacings, with the respective measured $PS_m$, $PA_m$ and $AD_m$ for the respective transmitter-to-receivers spacing; and (g) outputting the selected model values of HD, $r_m$ and $r_t$. (The term "transmitter-to-receivers spacing", in the embodiments hereof, means the spacing between a transmitter and the midpoint between a receiver pair.) In a disclosed embodiment, the selecting of step (f) comprises varying trial values of HD, $r_m$, and $r_t$, and selecting a combination of trial values that produces correspondence of PS, PA, and AD with $PS_m$, $PA_m$, and $AD_m$ at the respective transmitter-to-receivers spacings. In this embodiment, the steps (e) and (f) include generating, for each of said transmitter-to-receivers spacings, look-up tables between HD, $r_m$, $r_t$ and PS, PA, AD, and deriving the selected model values from the look-up tables and from $PS_m$, $PA_m$ and $AD_m$.

In a form of the invention, the steps (e) and (f) include: (h) generating, for each of the transmitter-to-receivers spacings, look-up tables between HD, $r_m$, $r_t$ and PS, PA, AD; (i) selecting a trial value of rr; (j) interpolating in each of the look-up tables to obtain, for the particular transmitter-to-receivers spacing, and for the current trial value of $r_m$, respective subsidiary look-up tables defining, for the respective transmitter-to-receivers spacings, PS as a function of (HD, $r_t$), PA as a function of (HD, $r_t$), and AD as a function of (HD, $r_t$); (k) deriving, from the subsidiary look-up tables for the respective transmitter-to-receivers spacings and the measured values $PS_m$, $PA_m$, and $AD_m$ for the respective transmitter-to-receivers spacings, an estimate of borehole diameter $HD_{est}$, and an estimate of the borehole corrected formation resistivity $r_{t(est)}$; (l) repeating steps (j) and (k) for other trial values of $r_m$, to obtain $HD_{est\ and\ rt(est)}$ for the respective transmitter-to-receivers spacings for each trial value of $r_m$; and (m) choosing one of the trial $r_m$ values as the selected model value of $r_m$ based on the $HD_{est}$ and $r_{t(est)}$ values resulting therefrom.

Preferably, as indicated, the measurement characteristics used in the invention include resistivity from a phase shift measurement, resistivity from a phase average measurement, and resistivity from an attenuation measurement, although variations are possible.

5

Further features and advantages of the invention will become more readily apparent from the following detailed description when taken in conjunction with the accompanying drawings.

BRIEF DESCRIPTION OF THE DRAWINGS

FIG. 5A, is a flow diagram which, in conjunction with the flow diagrams referred to therein, can be used in programming a processor or processors in implementing an embodiment of the invention.

FIG. 6A, is a flow diagram of a routine for controlling a processor to implement borehole logging and storage of measurements.

FIG. 7A, is a flow diagram of a setup routine represented by the block 520 of FIG. 5A.

FIG. 8A, is a flow diagram of the routine, represented by the block 530 of FIG. 5A, for generating and storing the main or coarse grid look-up table.

FIG. 9A, is a flow diagram of the routine, represented by the block 550 of FIG. 5B, for implementing an inversion to obtain first pass selected model values of borehole diameter, downhole mud resistivity, and borehole corrected formation resistivity that would produce a model phase shift and a model phase average that correspond, for each transmitter-to-receivers spacing, with the respective measured phase shift and phase average.

FIG. 10B, is a flow diagram of the routine, represented by the block 590 of FIG. 5B, for implementing an inversion to obtain second pass refined model values of downhole mud resistivity, borehole diameter and borehole corrected phase shift and attenuation formation resistivities.

DESCRIPTION OF THE PREFERRED EMBODIMENTS

Figure 1:
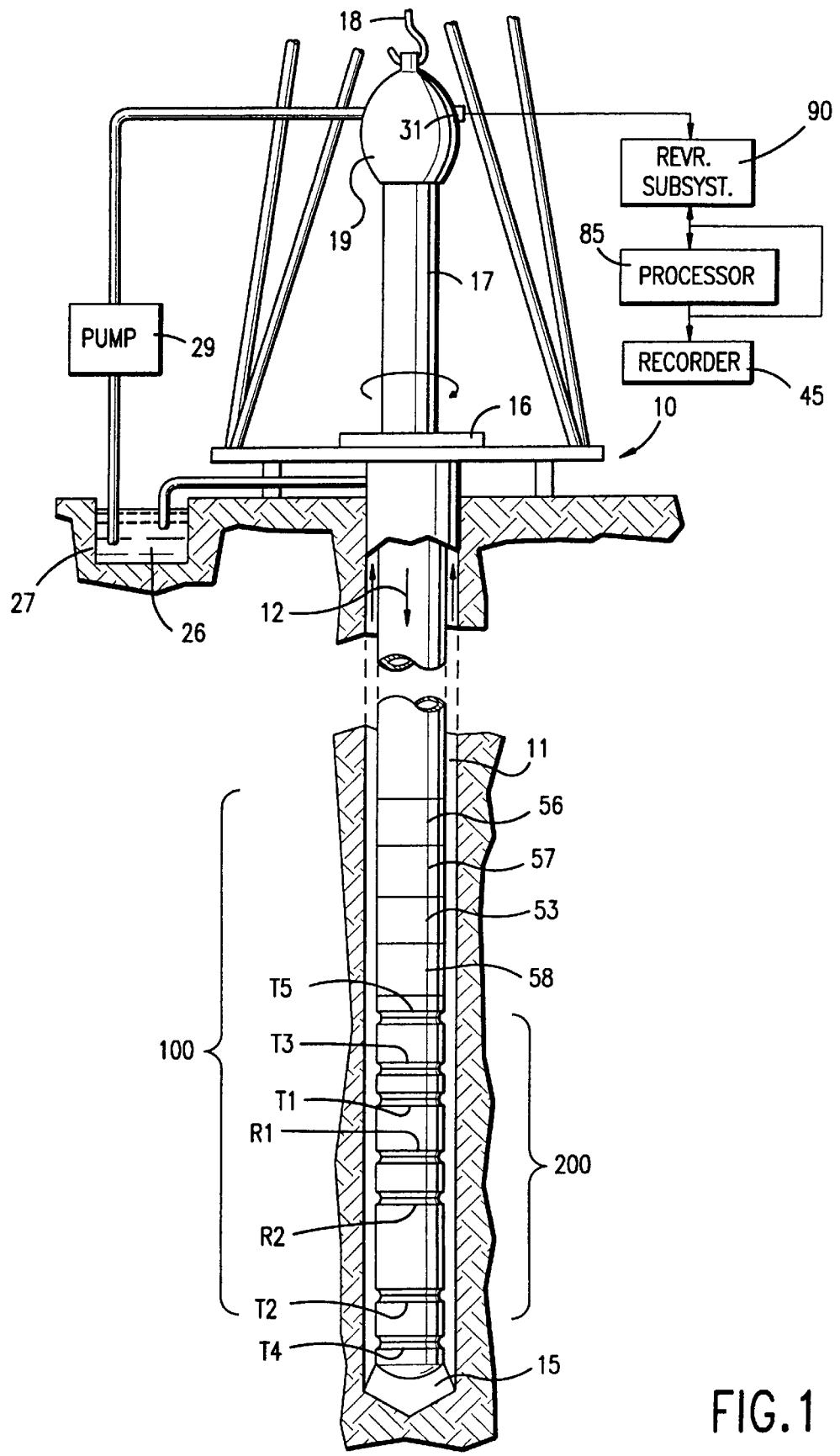
FIG. 1 is a diagram, partially in block form, of a system in which an embodiment of the invention can be employed, and which can be used to practice an embodiment of the method of the invention.

Referring to FIG. 1, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole and includes a drill bit 15 at its lower end. The drill string 12, and the drill bit 15 attached thereto, is rotated by a rotating table 16 (energized by means not shown) which engages a kelly 17 at the upper end of the drill string 12. The drill string 12 is suspended from a hook 18 attached to a traveling block (not shown). The kelly 17 is connected to the hook 18 through a rotary swivel 19 which permits rotation of the drill string 12 relative to the hook 18. Drilling fluid or mud 26 is contained in a pit 27 in the earth. A pump 29 pumps the drilling fluid into the drill string 12 via a port in the swivel 19 to flow downward through the center of the drill string 12. The drilling fluid 26 exits the drill string 12 via ports in the drill bit 15 and then circulates upward in the region between the outside of the drill string 12 and the periphery of the borehole 11. As is well known, the drilling fluid thereby carries formation cuttings to the surface of the earth, and the drilling fluid is returned to the pit 27 for recirculation. The small arrows in the Figure illustrate the typical direction of flow of the drilling fluid.

Mounted within the drill string 12, preferably near the drill bit 15, is a downhole sensing, processing, storing and transmitting subsystem 100. Subsystem 100 includes a measuring apparatus 200 which, in the present embodiment, includes five transmitting antennas T1, T2, T3, T4 and T5 and receiving antennas R1 and R2, and operates in the manner to be described below. The antennas can be of the type described in U.S. Pat. No. 4,899,112; that is, coils wound on mounting material around a special section of metal drill collar which comprises part of the subsystem 100. A communications transmitting portion of the downhole subsystem loo includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58. These electronics include a microprocessor (with associated memory, clock circuitry, and interface circuitry), and processing circuitry. The acquisition and processor electronics 58 are coupled to the measuring apparatus 200 and obtain measurement information therefrom. The acquisition and processor electronics 58 are capable of storing data from the measuring apparatus 200, processing the data and storing the results, and coupling any desired portion of the information it contains to the transmitter control and driving electronics 57 for transmission to the surface by transmitter 56. A battery 53 may provide downhole power. As is known in the art, a downhole generator (not shown) such as a so-called "mud turbine" powered by the drilling fluid, can also be utilized to provide power during drilling. If desired, the drilling equipment can optionally be a directional drilling apparatus (not shown) which has, for example, a bottom hole assembly that includes a stabilizer, an offset (or "bent") sub, a mud motor that is driven by the flowing mud, and a near-bit stabilizer. The bent sub typically has an offset or bend angle of ½ to 2 degrees. As is known in the art, when the bit is driven by the mud motor only (with the drill string stationary), the bit will deviate in a direction determined by the tool face direction in which the drill string and bent sub are oriented (so-called "sliding mode"). When it is desired to drill substantially straight, the drill string and the mud motor are both rotated at appropriate rates (so-called "rotating mode"). In this manner, directional drilling can be implemented with reasonable accuracy and without undue frequent tripping of the drill string.

Figure 2:
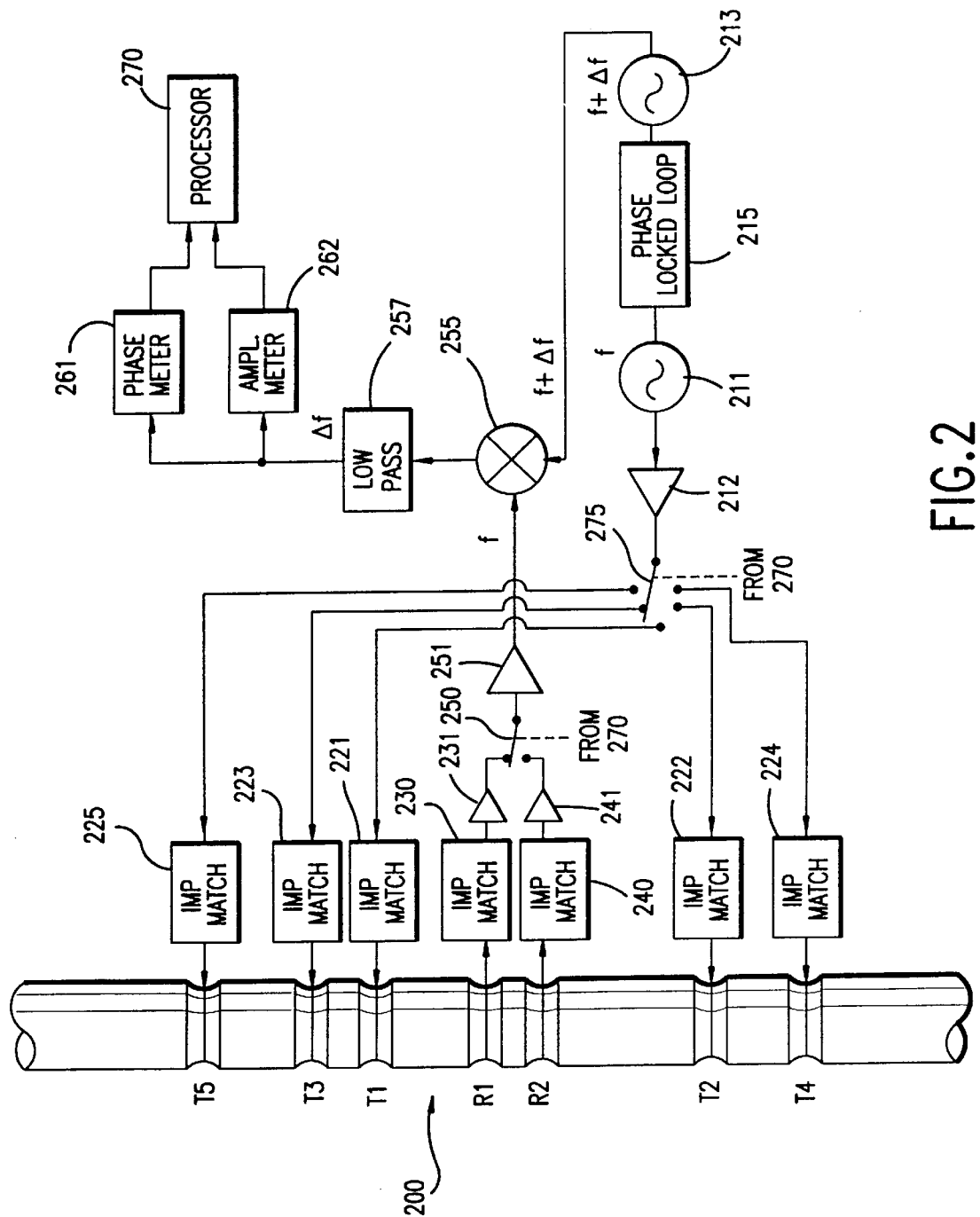
FIG. 2 is a diagram, partially in block form, of electronics in the measuring apparatus and the acquisition and processor electronics of the FIG. 1 embodiment.

FIG. 2 is a block diagram of electronics in the measuring apparatus 200 and the acquisition and processor electronics 58. A master oscillator 211 produces an electrical signal of frequency f (e.g. at 2 MHZ), which is amplified by amplifier 212 and applied, via electronically controlled switch 275, to one of the transmitting antennas T1, T2, T3, T4 or T5 through respective impedance matching circuits 221, 222, 223, 224, and 225. The switch 275, under control of the processor 270, selects the transmitter T1, T2, T3, T4 or T5 that is to be energized. The signal from receiver R1 is coupled, via impedance matching circuit 230 and preamplifier 231, to one input of an electronically controlled switch 250. Similarly, the signal from receiver R2 is coupled via impedance matching circuit 240 and preamplifier 241 to the other input of the switch 250. The switch 250, under control of processor 270, selects the (R1) or (R2) receiver output. The selected signal is amplified by amplifier 251 and subsequently translated to a lower frequency $\Delta f$ using a known heterodyne technique. A local oscillator 213 is in a phase locked loop (represented at 215) with the master oscillator 211. The local oscillator 213 has a frequency $f+\Delta f$, where $\Delta f$ is typically a few kilohertz or less. A signal from the local oscillator is mixed with the received signal by a mixer 255, and the mixer output is passed through a low pass filter 257 which blocks signals at f and $f+\Delta f$ and passes the signal at $\Delta f$. The signal at frequency $\Delta f$ contains the phase and amplitude information of the original signal at frequency f. The recognized advantage of this frequency translation is that it is easier to measure the phase and amplitude at kilohertz or lower frequencies than at megahertz frequencies. The signal at frequency $\Delta f$ is measured with a phase meter 261 and with an amplitude meter 262, and the results are input to the processor 270. The phase meter 261 may utilize a reference signal from the phase locked loop 215. The phase and amplitude meters may also include sample-and-hold circuits, to implement comparison of the signal from the respective receivers. Also, the processor can compute the relative phase and amplitude (as well as phase average, as will be described) from the measurements it receives. Reference can be made to U.S. Pat. Nos. 4,185,238; 4,899,112; and 5,594,343, assigned to the same assignee as the present application.

As noted above, the processor 270 has associated memory, clocking, and interface circuitry (not shown), as is conventional. The processor 270 can implement storage of the measurements of phase and amplitude, processing of these measurements, storage of the results of the processing, and/or coupling of the measurements and/or processing results to the control and driving electronics 57 for transmission to the earth's surface. As is known in the art, a downhole clock can be utilized to keep track of time, which can subsequently be correlated with depth level by virtue of keeping a record of the drill string progress. (In general, depth level means longitudinal depth in the borehole.) The clock, which can typically be part of the system in conjunction with the processor 270, can be synchronized with the system before a trip downhole. Also, if desired, communication with the downhole subsystem 100, using mud pulse technology or other suitable communication means, can be utilized to convey timing synchronization and/or depth level information, as well as to communicate data in general. It will be understood that the invention can be utilized in conjunction with any suitable technique for keeping track of depth level.

As noted above, the amplitude and phase measured at a single receiver produce relatively shallow measurements and are sensitive to the near borehole media. For this reason, the basic measurements of electromagnetic propagation logging tools are usually phase shift and attenuation across a receiver pair, the differential nature of these measurements tending to cancel most of the near borehole effects, and to reduce the contribution of the borehole fluid to the measurements.

Figure 3:
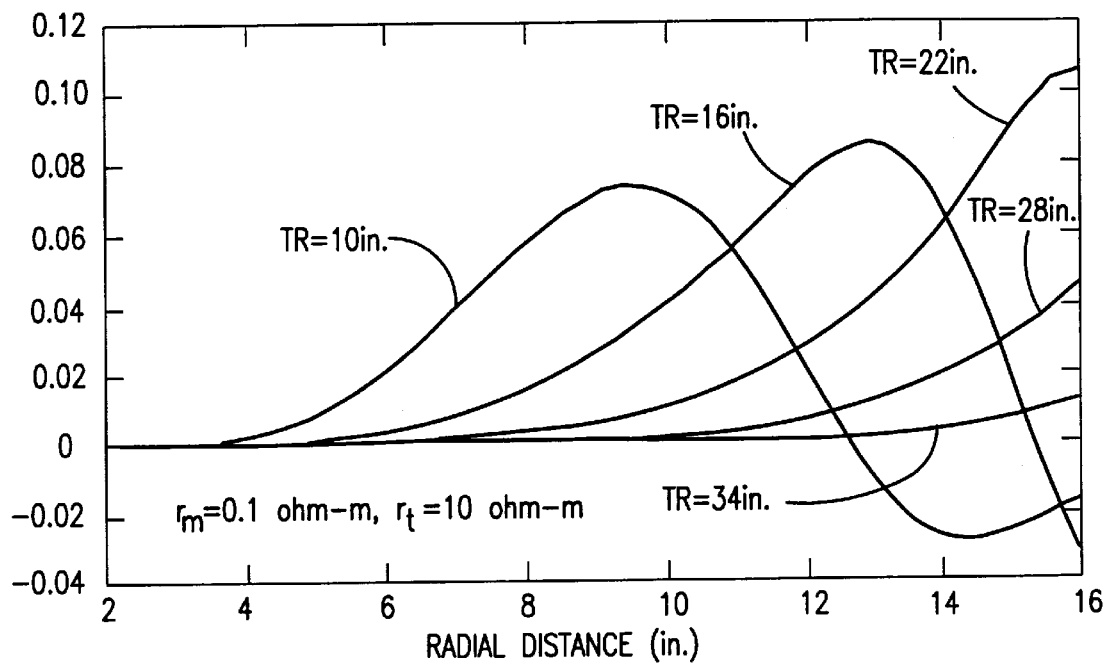
FIG. 3 is a graph of phase shift resistivity radial response functions for five different transmitter-to-receivers spacings.
Figure 4:
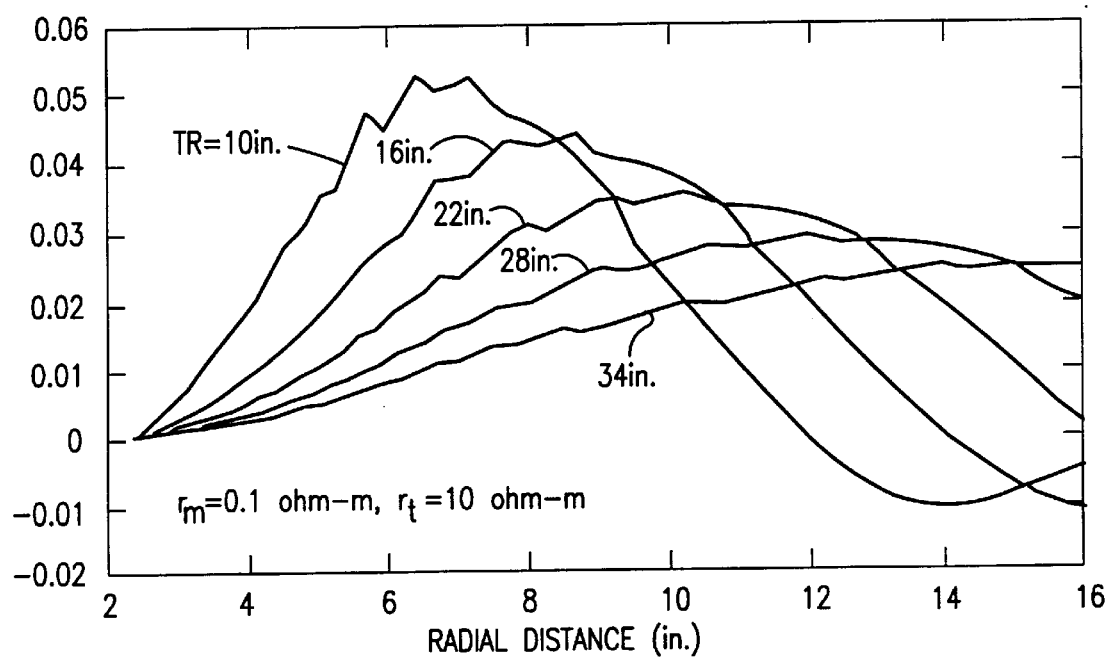
FIG. 4 is a graph of phase resistivity radial response functions for five different transmitter-to-receivers spacings.

The averaged phase at the receivers of a receiver pair is more sensitive than the phase shift to the near borehole conductivity. FIGS. 3 and 4, generated from modeling, and which respectively show plots of radial resistivity response functions determined from phase shift and radial resistivity response functions determined from phase, and illustrate the higher sensitivity of the phase measurement to the borehole. In both Figures, the mud resistivity, $r_m$, is 0.1 ohm-m, and the formation resistivity, $r_t$, is 10 ohm-m. The five curves shown in each Figure are for the respective transmitter-to-receiver pair spacings (TR) of 10, 16, 22, 28 and 34 inches.

Referring to FIG. 5, there is shown a flow diagram of a routine which, in conjunction with the routines referred to therein, can be used in programming the processors, such as processors 85 and 270 of FIGS. 1 and 2, respectively, to implement operation in accordance with an embodiment of the invention. In the illustrative embodiment hereof, certain operations are performed and/or controlled by downhole or by uphole electronics, as the case may be, but it will be understood that the invention can be implemented with some of the operations performed at different alternative locations. The block 510 represents the routine, described in further detail in conjunction with FIG. 6, for implementing the borehole logging and storage of measurements. This includes measurement of amplitude and phase at each receiver for each of the transmitter-to-receivers spacings and, in the present embodiment, also includes computation of the measured phase shift $PS_m$, the measured phase average $PA_m$, and the measured attenuation $AD_m$, for each of the transmitter-to-receivers spacings.

Figure 7A:
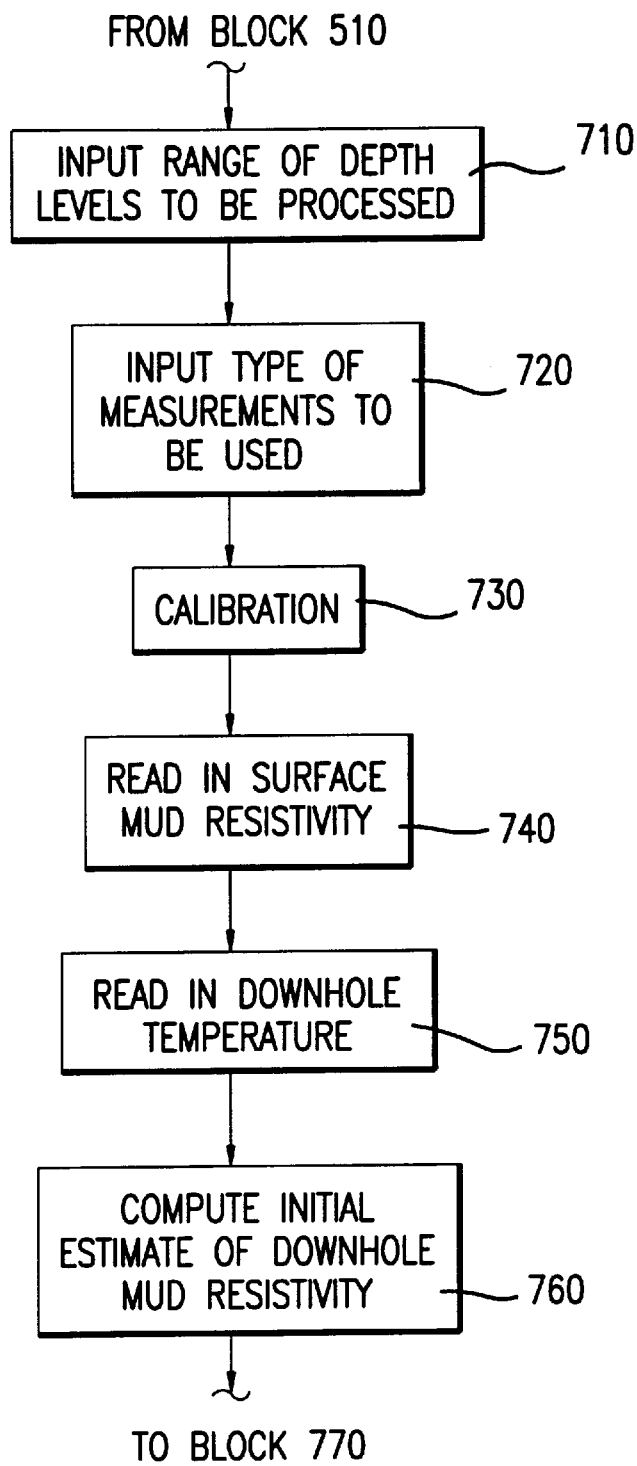
FIGS. 7A–7B, which includes FIG. 7B placed below

The block 520 represents a setup routine that is described in further detail in conjunction with the flow diagram of FIG. 7. The next block, block 530, represents the routine for generating and storing the main look-up table, the routine for which is described in further detail in conjunction with the flow diagram of FIG. 8. The block 540 is then entered, this block representing initializing a depth level index to the first depth level at which the processing is to be performed in accordance with the present embodiment. The block 550 is then entered, this block representing the implementing of the routine described further in conjunction with the flow diagram of FIG. 9 for obtaining and storing the first pass selected model values of downhole mud resistivity $r_m$, borehole diameter HD, and borehole corrected formation resistivity $r_t$. The decision block 560 is then entered, this block representing inquiry as to whether the last depth level to be processed in the present pass has been reached. If not, the depth level index is incremented (block 570), block 550 is re-entered, and the loop 565 continues until all desired depth levels have been processed. The determined selected model values can be read out and utilized, but in a preferred embodiment hereof are employed in further processing. Block 580 represents the reading out of the first pass mud resistivity estimates to be used in second pass (the final pass, in this embodiment) processing represented by block 590 to obtain final estimates of model parameters; that is, mud resistivity ($r_m$), hole diameter (HD) and borehole-corrected phase shift resistivity and attenuation resistivity ($r_{ps\text{-}BHC}$, $r_{ad\text{-}BHC}$). The block 595 represents the reading out of the selected final pass model values. Readout can be, for example, to another storage or recording medium, or to a display (not shown). (Although all the processing is shown as being performed at the borehole site in the illustrated embodiment, it will be understood that, if appropriate, the processing, or a portion thereof, can be performed remote from the borehole site, such as by communications link.)

Figure 5A:
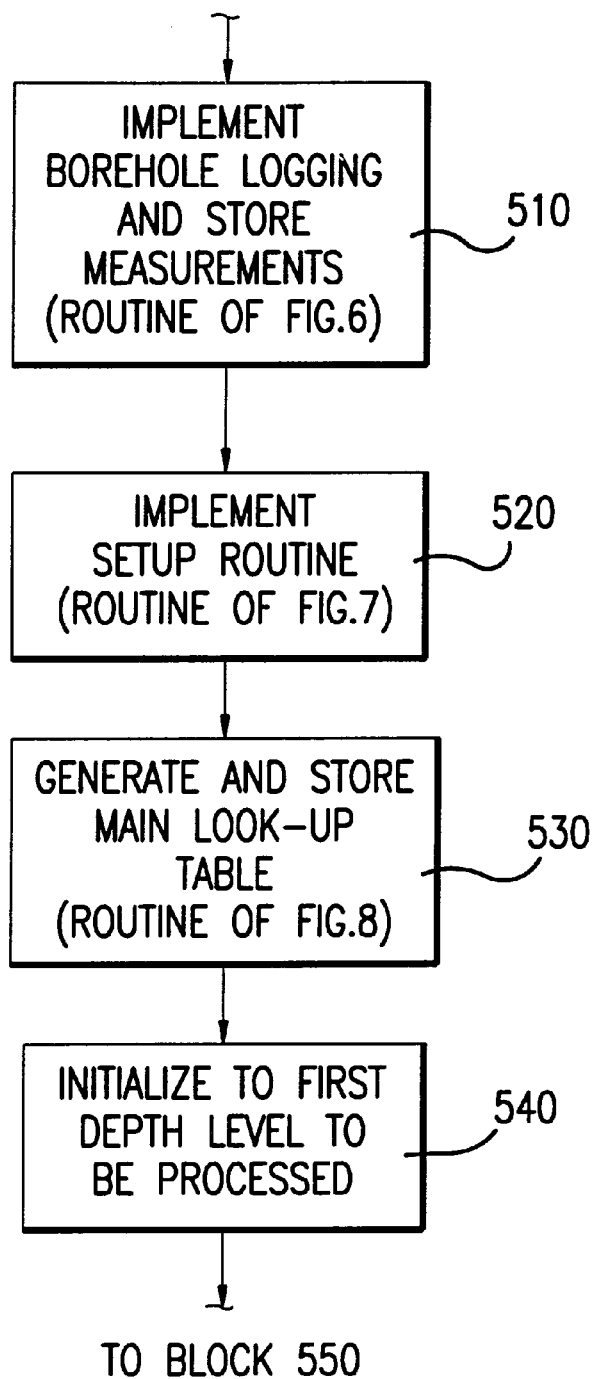
FIGS. 5A–5B, which includes FIG. 5B placed below
Figure 6A:
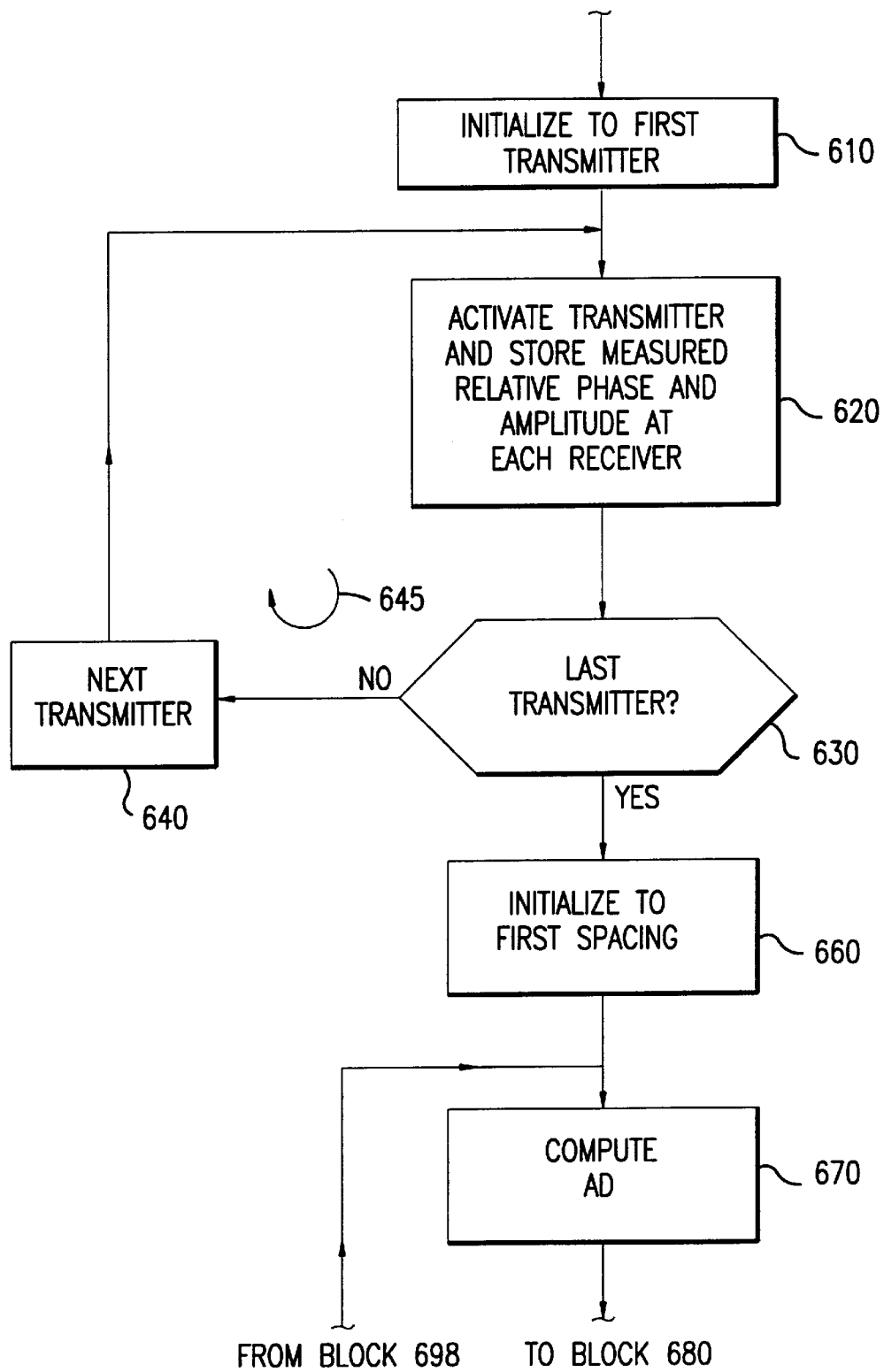
FIGS. 6A–6B, which includes FIG. 6B placed below
Figure 6B:
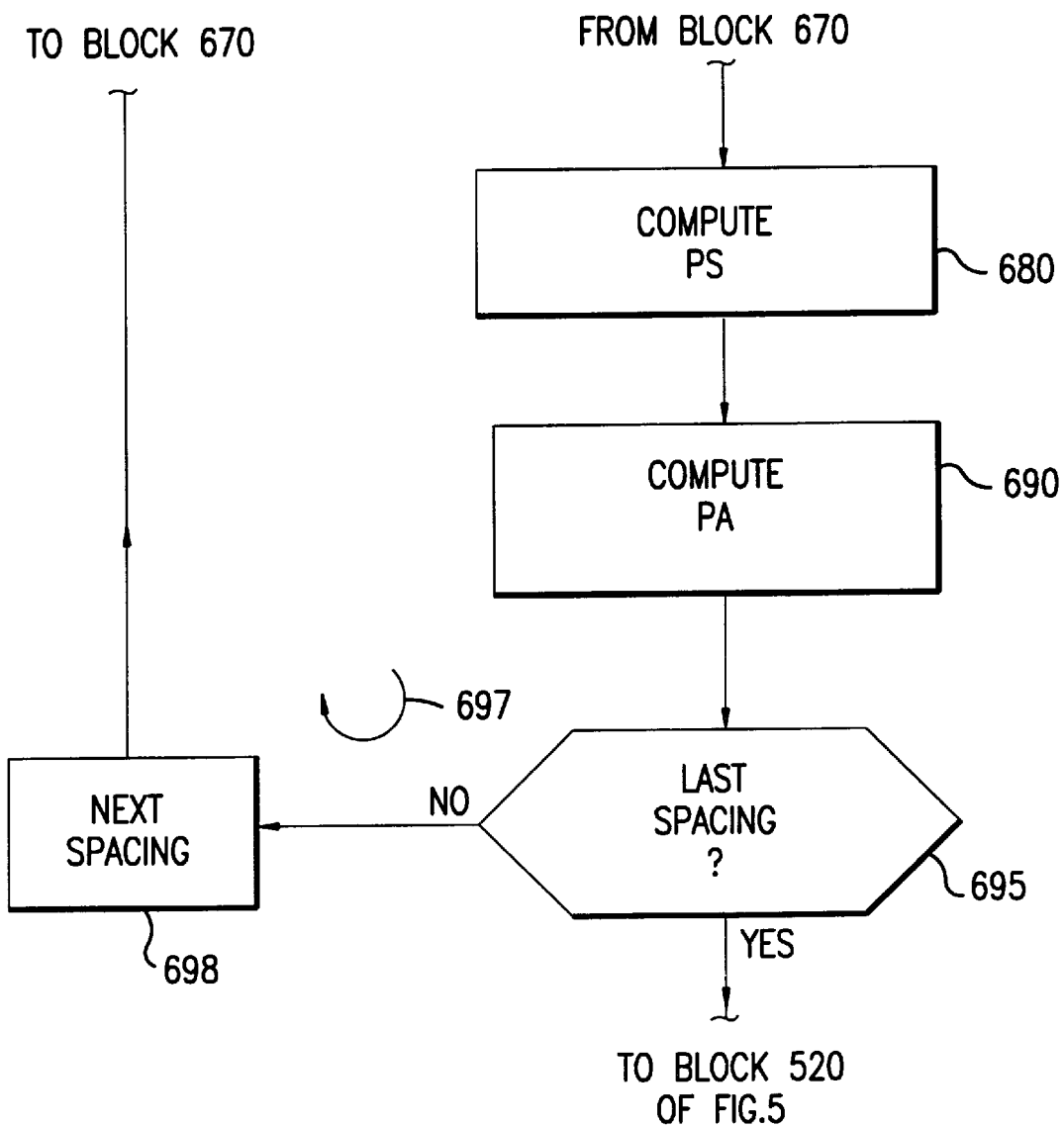

Referring to FIG. 6, there is shown a flow diagram of a routine, represented generally by the block 510 of FIG. 5A, for controlling a processor (e.g. 270 of FIG. 2) of the embodiment of FIGS. 1 and 2, with five transmitters, to implement borehole logging and store measurements. (The same type of routine can be used for any number of transmitters.) The blocks 610, 620, 630, and 640, and the loop 645, operate to sequentially cause energizing of each transmitter (T1 through T5, in this case), and the controlling of the measuring, at each receiver, of the relative phase and the amplitude of the received signals, associated with each energized transmitter. Reference can be made to the above referenced U.S. Pat. No. 5,594,343 for further details. It will be understood also that other techniques can be employed for implementing the measurements. The block 610 represents initializing to the first transmitter, and the block 620 represents activating the transmitter (by control of switch 275 or FIG. 2) and storing the relative phase and the amplitude measured at each of the receivers of the receiver pair R1 and R2 (see FIG. 2). The decision block 630 represents the determination of whether the last transmitter has been activated. If not, the block 640 is entered, the transmitter index is incremented, and the block 620 is re-entered. The loop 645 continues until all measurements have been made and stored for the present depth level.

The blocks 660, 670 and 680 are used to respectively compute, for each transmitter-to-receivers spacing, the attenuation AD, the phase shift PS, and the phase average PA from the relative phase and amplitude measurements at receiver R1 (respectively designated $\phi_1$ and $A_1$) and the relative phase and amplitude measurements at receiver R2 (respectively designated $\phi_2$ and $A_2$). In the present embodiment, the quantities AD, PS, and PA are computed from the following relationships:

$$AD = 20\log_{10}[A_1/A_2]$$

$$PS = \phi_2 - \phi_1$$

$$PA = (\phi_2 + \phi_1)/2$$

The block 660 represents initializing to the first transmitter-to-receivers spacing, whereupon AD, PS and PA are computed, as indicated. The decision block 695, increment block 698, and loop 697 are then continued until all spacings have been processed. Alternatively, the blocks 670, 680, and 690 could be under the block 620 in the loop 645, for computation of AD, PS, and PA directly after each set of measurements for a particular spacing is taken.

FIG. 7 is a flow diagram of the setup routine represented generally by the block 520 of FIG. 5A. In the present embodiment, an operator can input various preliminary information relating to the processing to be performed. The block 710 represents the inputting of the range of depth levels to be processed; that is, the depth levels at which the downhole mud resistivity $r_m$, borehole diameter HD, and borehole corrected formation resistivity $r_t$, or at least some of these, are to be determined for a particular procedure. The block 720 represents the inputting of the transmitter-to-receivers spacings to be used, and the measurements to be made. In the present example, there are five transmitter-to-receivers physical spacings. (As described in the above referenced U.S. Pat. No. 5,594,343, further "computed" spacings can also be generated.) In the present embodiment there are five phase measurements and five amplitude measurements at each of the two receivers, so, at each depth level, there are ten phase measurements and ten amplitude measurements, in all. (The raw phase measurements can conventionally be the phase relative to a reference, as described above.) The block 730 represents implementation of any computed calibration that is to be used.

Continuing with the description of the flow diagram of FIG. 7, the block 740 represents the inputting of the mud resistivity as measured at the surface, $r_{m0}$, if available. An estimate of downhole mud resistivity can be obtained using uphole mud resistivity $r_{m0}$, the uphole temperature $T_u$ (in degrees F.), and the downhole temperature $T_d$, if available, in accordance with the relationship $$r_m = r_{m0}(T_u + 6.77)/(T_d + 6.77).$$

The block 750 represents the reading in of downhole temperature, if available, and the block 760 represents the computation of an estimate of downhole mud resistivity $r_m$ from the formula. (For all initial model values, it will be understood that the best information available can be used for initial estimates.) The drill bit size can also be input (block 770) as an approximate indicator of borehole diameter in certain types of formations.

In the present embodiment, an initial set of model values for HD, $r_m$, and $r_t$ are provided, and used in generating the main look-up table (which can be thought of as a "coarse grid" look-up table). During the setup routine the initial (or "coarse grid") model values of HD, $r_m$ and $r_t$ to be used can be read in, as represented by the blocks 775, 785 and 795, respectively. In one example, twelve initial borehole diameter model values (ranging from 5.25 inches to 18 inches) are used, ten initial mud resistivity values (ranging from 0.02 ohm-m to 10 ohm-m) are used, and eight formation resistivity values (ranging from 0.1 ohm-m to 300 ohm-m) are used. The block 530 of FIG. 5A can then be entered.

Figure 8A:
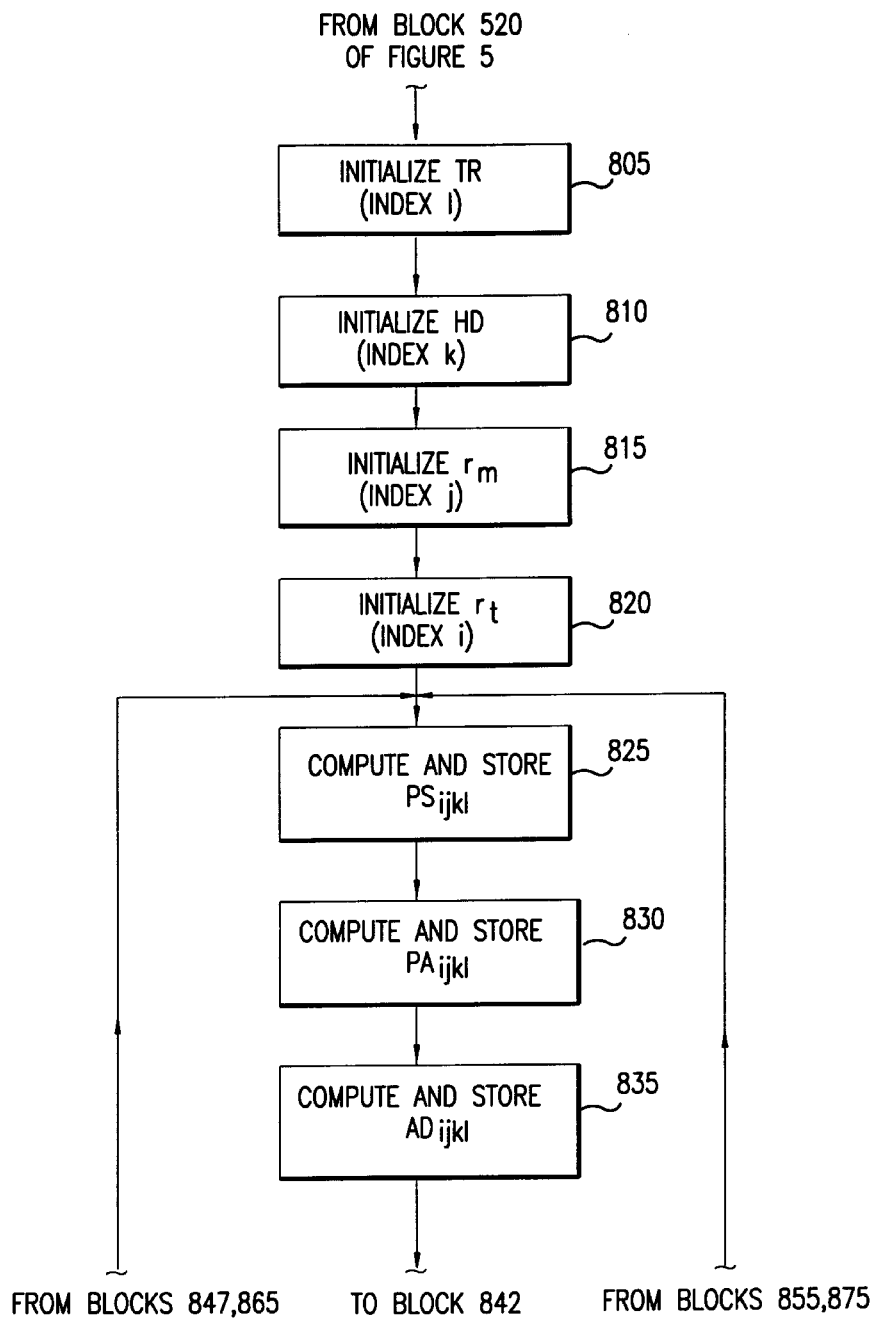
FIGS. 8A–8B, which includes FIG. 8B placed below
Figure 8B:
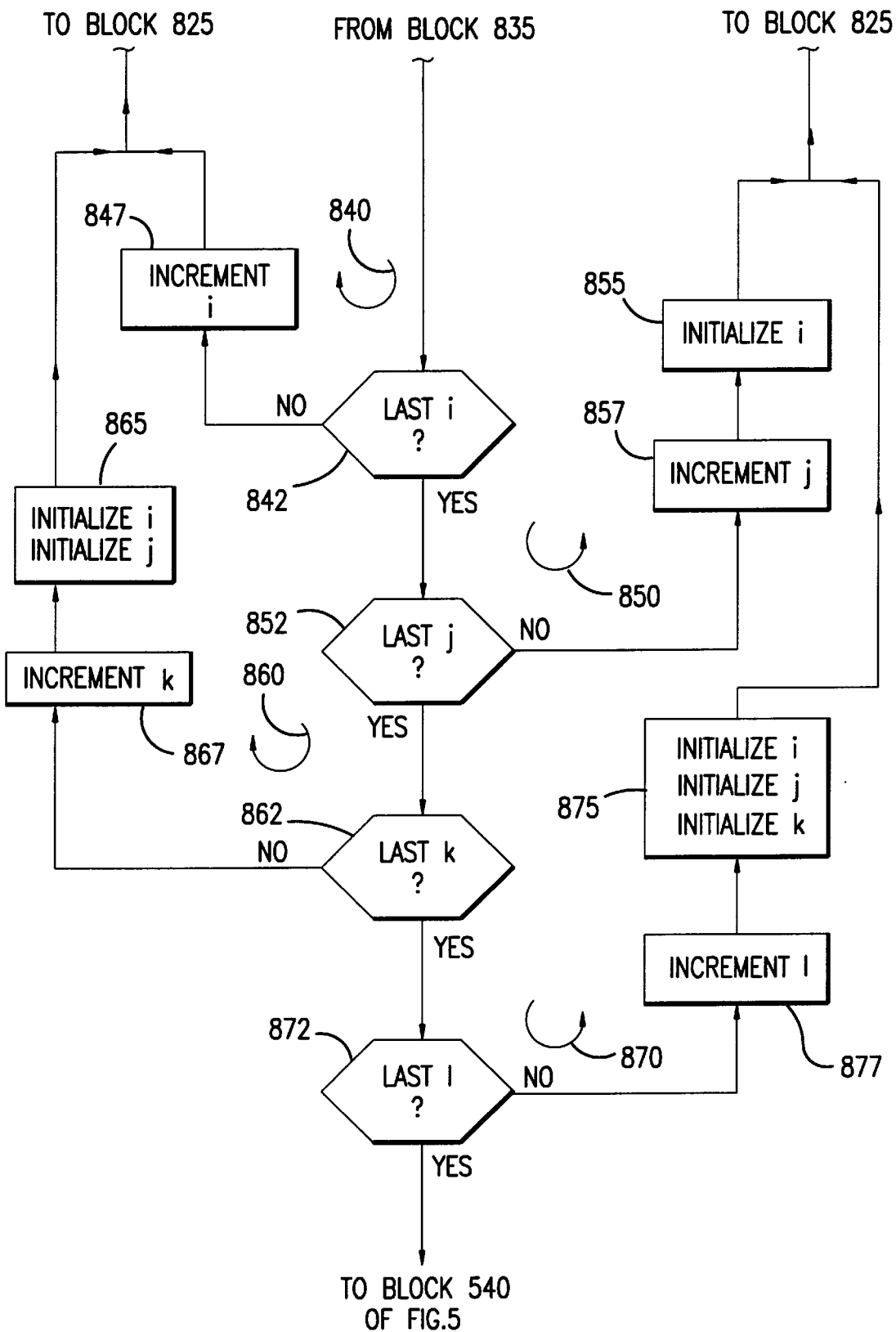

In an embodiment of the invention, a main look-up table is generated, relating TR, HD, $r_m$, and $r_t$ to PS, PA, and AD. FIG. 8 is a flow diagram of a routine for generating and storing the look-up table (the main or coarse grid look-up table) that is used, in an embodiment of the invention, to relate values of PS, PA, and AD to model values of transmitter-to-receivers spacing, borehole diameter HD, downhole mud resistivity $r_m$, and borehole corrected formation resistivity $r_t$. In generating PS as a function of TR, HD, $r_m$, and $r_t$, PA as a function of TR, HD, $r_m$, and $r_t$, and AD as a function of TR, HD, $r_m$, and $r_t$, the index i is used to represent values of $r_t$ the index j is used to represent values of $r_m$ the index k is used to represent values of HD, and the index l is used to represent values of TR. Thus, the values stored in the look-up table are designated as $PS_{ijkl}$, $PA_{ijkl}$, and $AD_{ijkl}$.

Figure 7B:
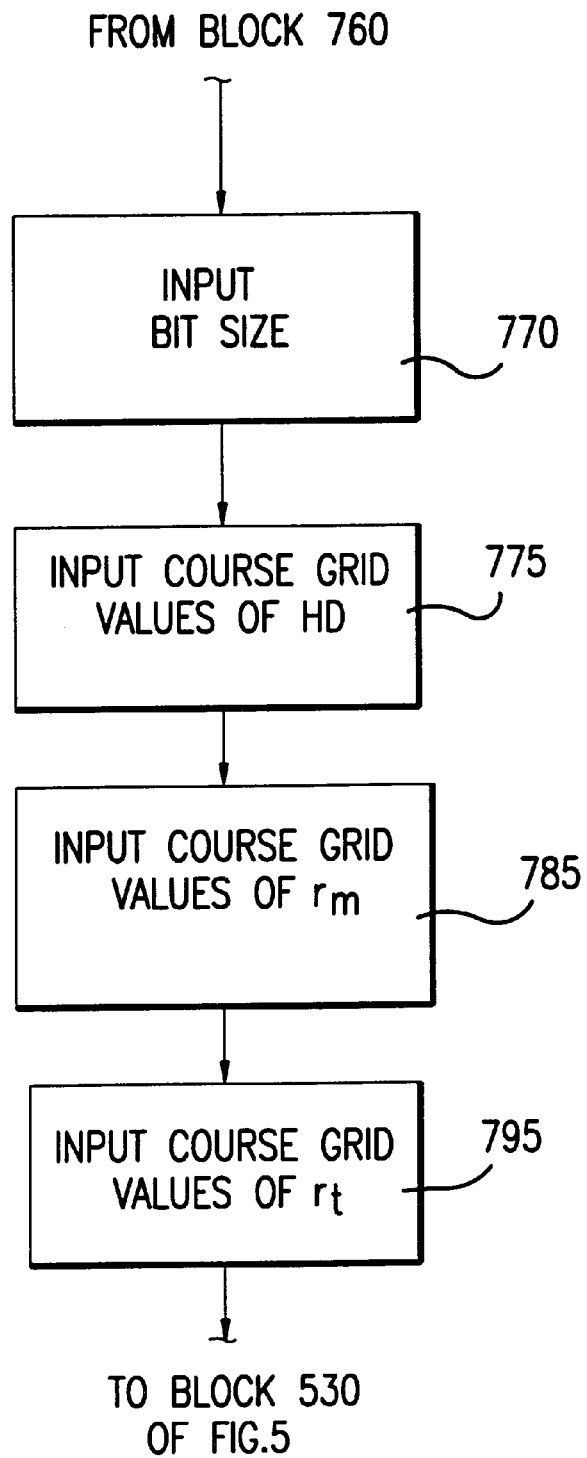
Figure 11:
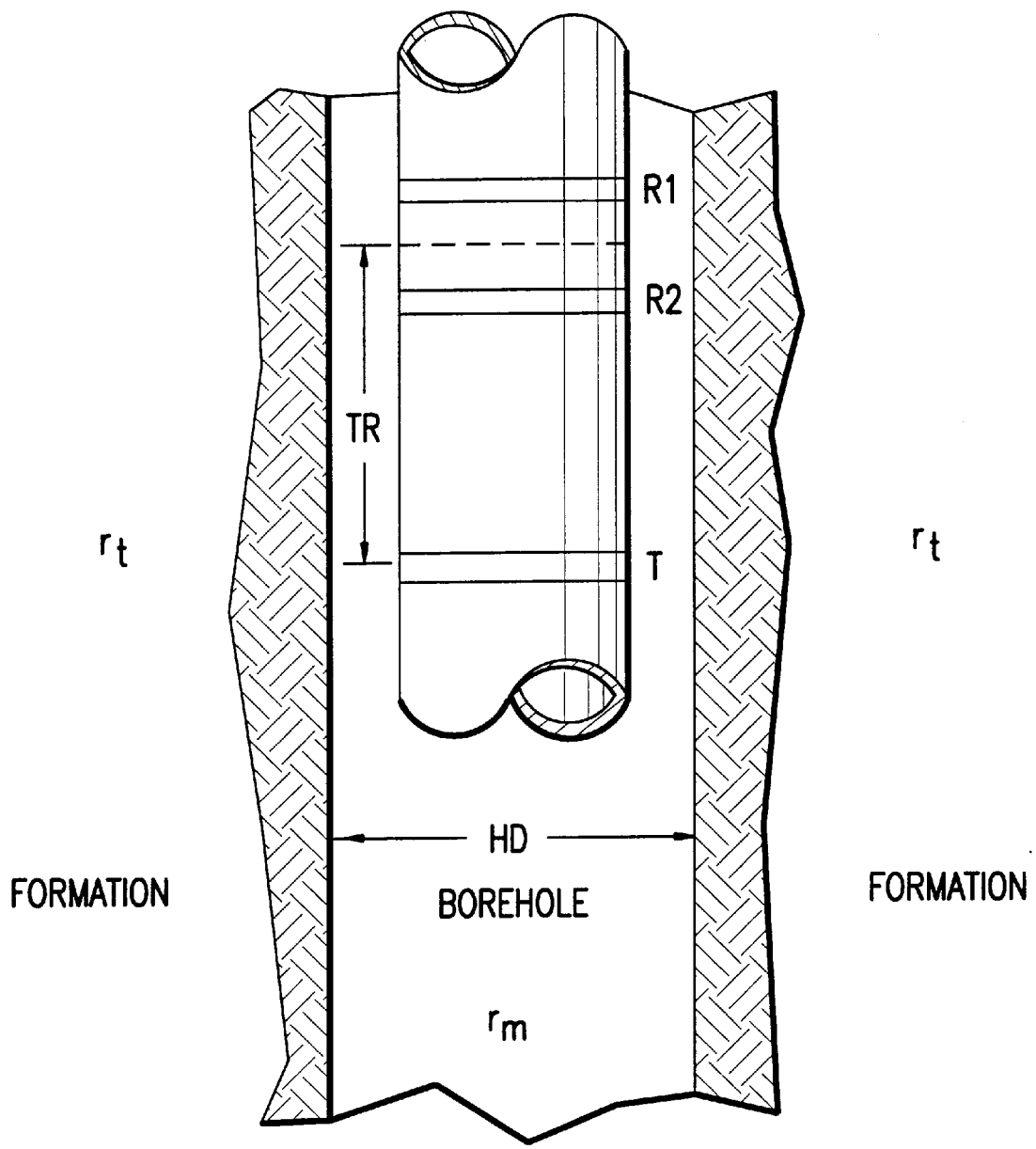
FIG. 11 is a diagram illustrating a stepped model used in an embodiment of the invention.

The coarse grid values of TR, HD, $r_m$, and $r_t$, to be used were initially input by an operator (see blocks 775, 785, and 795 in FIG. 7B above). In the flow diagram of FIG. 8, the block 805 represents the initializing of TR (index l) to its first value, the block 810 represents the initializing of HD (index k) to its first value, the block 815 represents the initializing of $r_m$ (index j) to its first value, and the block 820 represents the initializing of $r_t$ (index i) to its first value. Next, the block 825, represents the computation and storage of $PS_{ijkl}$, using forward modeling in a so-called step model shown in FIG. 11 (with a borehole of diameter HD and resistivity $r_m$, a formation of resistivity $r_t$, and a transmitter-to-receivers spacing TR) in which the model parameters are defined by the described indices i, j, k, and l. Various techniques can be utilized to compute the amplitude and relative phase of electromagnetic energy at the frequency employed in the present embodiment, such as by using a routine for computation of the complex amplitude and phase at the receiver locations in media having a defined geometry and resistivities, and the specified spacings, all determined from the particular logging tool to be employed. An example of such a routine is described in the following publication: Anderson, B. and Chew, W. C., "A New High Speed Technique For Calculating Synthetic Induction And DPT Logs", SPWLA 25th Annual Logging Symposium (1984), Paper HH. Reference can also be made to the above-referenced U.S. Pat. No. 5,594,343, and to "Field Computation By Moment Methods", Roger Harrington, IEEE Press, 3rd Ed. 1993; and to "Electromagnetic Wave Theory", Jim Kong, Wiley-Interscience, 1986.

It will be understood that other suitable techniques could be utilized to make the forward modeling computations. Accordingly, the previously referenced block 825 represents the computation and storage of $PS_{ijkl}$ for the current indices, the block 830 represents the computation and storage of $PA_{ijkl}$ for the current indices, and the block 835 represents the computation and storage of $AD_{ijkl}$ for the current indices. Subsequently, four nested loops, 840, 850, 860 and 870, are used to produce all combinations of the indices so that $PS_{ijkl}$, $PA_{ijkl}$, and $AD_{ijkl}$ are obtained for all combinations of coarse grid values of TR, HD, $r_m$ and $r_t$. More specifically, the four nested loops 840, 850, 860 and 870, are respectively used to iterate the index values of i, j, k, and l. In the loop 840, the determination of whether the last i (that is, the last $r_t$ value) has been reached is represented by the decision block 842, and the incrementing of the index i is represented by the block 847. In the loop 850, the decision as to whether the last j (that is, the last value of $r_m$) has been reached is represented by the decision block 852, and the incrementing of the index j is represented by the block 857. Each time the loop 850 is traversed, the index i is initialized (block 855) for the next sequence in the subsidiary loop 840. In the loop 860, the decision as to whether the last k (that is, the last value of HD) has been reached is represented by the decision block 862, and the incrementing of the index k is represented by the block 867. Each time the loop 860 is traversed, the indices j and i are initialized (block 865) for the next sequence in the subsidiary loops 850 and 840. In the loop 870, the decision as to whether the last l (that is, the last value of TR) has been reached is represented by the decision block 872, and the incrementing of the index l is represented by the block 877. Each time the loop 870 is traversed, the indices k, j, and i are initialized (block 875) for the next sequence in the subsidiary loops 860, 850, and 840. In this manner, it will be seen that the coarse grid look-up table is computed and stored with $PS_{ijkl}$, $PA_{ijkl}$, and $AD_{ijkl}$, for all coarse grid values $r_t$ (index i), $r_m$ (index j), HD (index k), and TR (index l). The tables described in conjunction with FIG. 8 are computed only once and the data stored for future inversion applications.

Figure 5B:
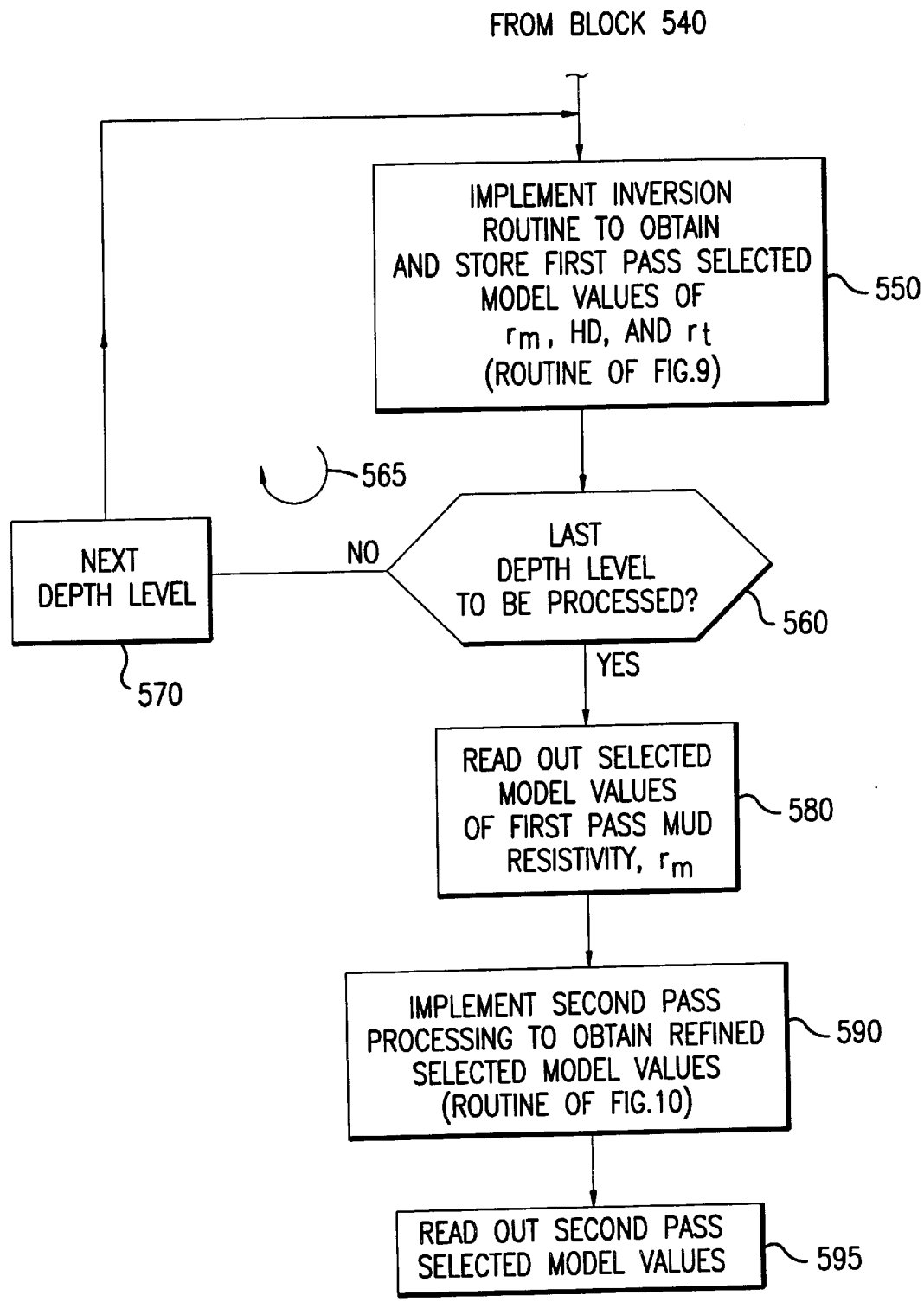

FIG. 9 is a flow diagram of the routine represented by the block 550 of FIG. 5B for implementing an inversion routine to obtain and store selected model values of $r_m$, HD and $r_t$. In the flow diagram of FIG. 9, the block 910 represents the inputting of an initial mud resistivity, $r_m$. In an example of the present embodiment, it is assumed that the downhole mud resistivity, $r_m$, is not known with a high degree of confidence (as may be the case, for example, in a zone where there is mixing with the formation fluids). The initial estimate of the downhole mud resistivity (that is, the mud resistivity in the portion of the borehole where the receiver pair of the logging equipment is presently located) may be, for example, an estimate based on the mud resistivity measured at the surface, $r_{m0}$, and the downhole temperature, $T_d$, in accordance with the previously indicated formula. The operator can also input a range of downhole mud resistivities to be considered, and the increment for downhole mud resistivity values to be utilized in the inversion (block 915).

The block 920 is next entered, this block representing an interpolation in the previously formed coarse grid look-up table with the current trial value of $r_m$ (which will be the operator selected $r_m$ for the first traversal through the loop), so that for each TR spacing, HD and $r_t$ are interpolated to obtain a supplemental three-dimensional look-up table, for each of PS, PA, and AD. (The main look-up table, it will be recalled, is four dimensional (for each of PS, PA, and AD), with the dimensions $r_m$, $r_t$, HD, and TR). Interpolation, throughout, is preferably performed in the logarithmic domain for $r_m$ and $r_t$. After the supplemental look-up table is formed for the current trial value of $r_m$, the block 930 is entered, and a TR spacing index is initialized to the first spacing (which, in the present example is a 10 inch spacing that is the first of five TR spacings). Next, using the supplemental look-up table for the current trial value of $r_m$ and the current TR spacing, the supplemental look-up table is used to determine HD and borehole corrected phase shift resistivity, $r_{ps-BHC}$ values corresponding to $PS_m$ (the measured phase shift), and $PA_m$ (the measured phase average)

through a two dimensional interpolation. The two dimensional interpolation can be more easily visualized as the combination of two one-dimensional interpolations described in conjunction with blocks 935, 940 and 945. As represented by the block 940, interpolation is performed between PA values (corresponding to the HD values) to the measured phase average, $PA_m$, to find the corresponding interpolated HD value, which is called $HD_{est}$ $(TR,r_m)$.

Figure 12:
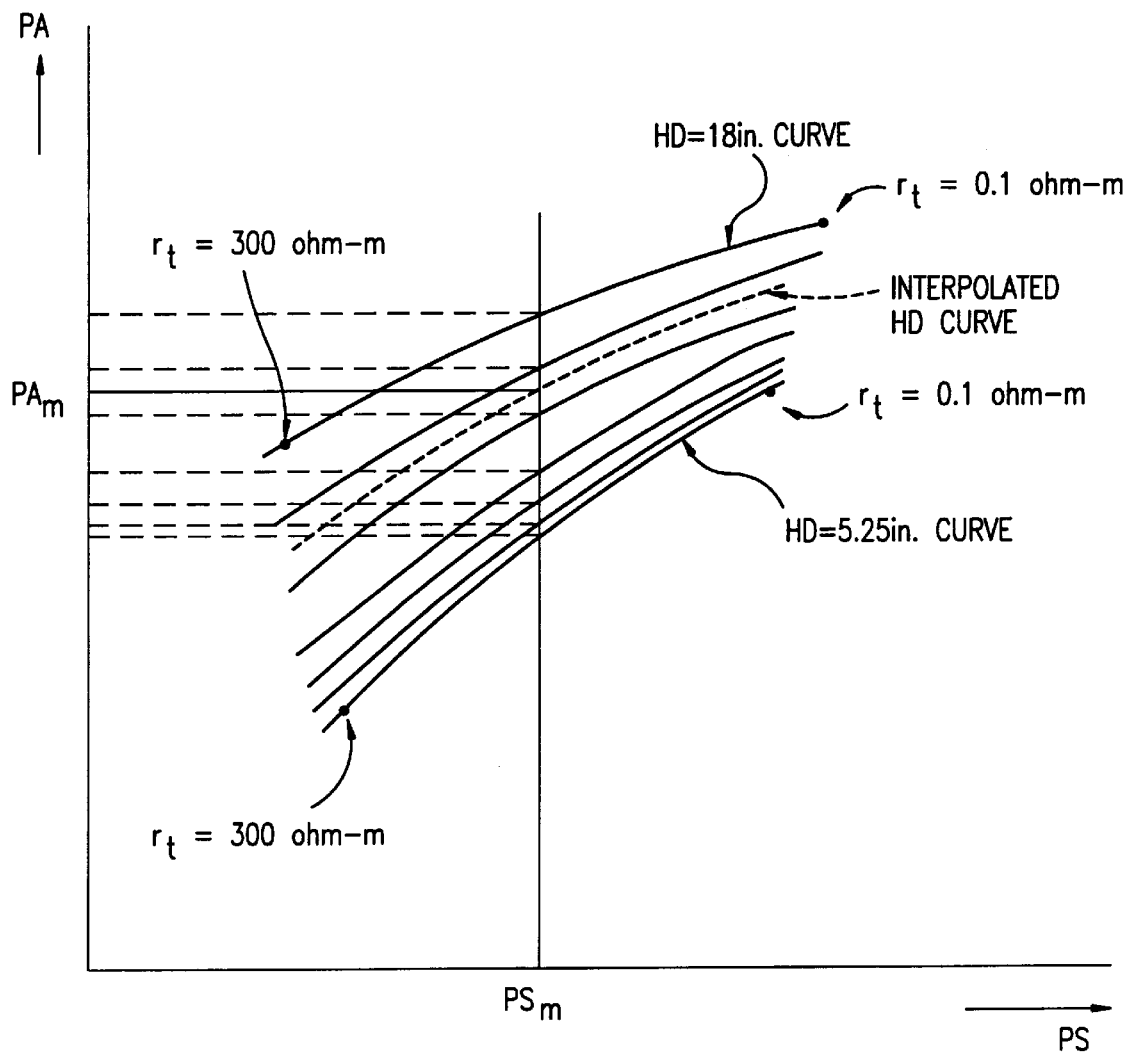
FIG. 12 is a diagram, for a particular transmitter-to-receivers spacing and a particular downhole mud resistivity, of phase average versus phase shift, for varying values of borehole diameter and borehole corrected formation resistivity, that is useful in understanding operation of an embodiment of the invention.
Figure 13A:
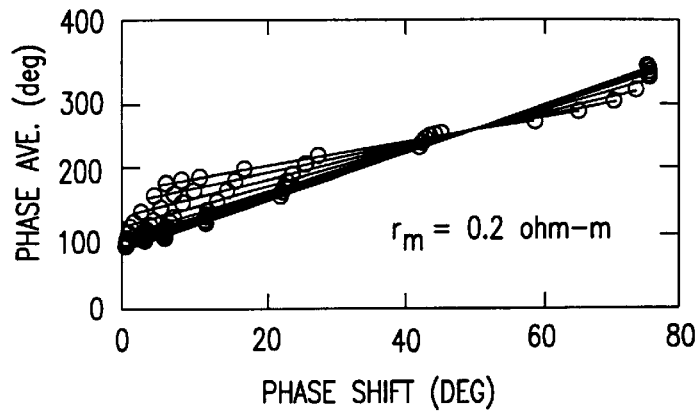
FIGS. 13A–13F illustrates, for a particular transmitter-to-receivers spacing, and for particular downhole mud resistivities, graphs of phase average versus phase shift for varying values of borehole diameter and borehole corrected formation resistivity. In the example of the graphs of FIG. 13, the transmitter-to-receivers spacing is 22 inches.
Figure 13B:
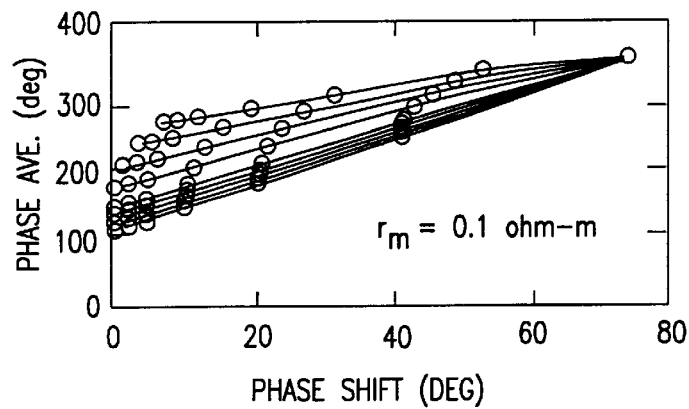
Figure 13C:
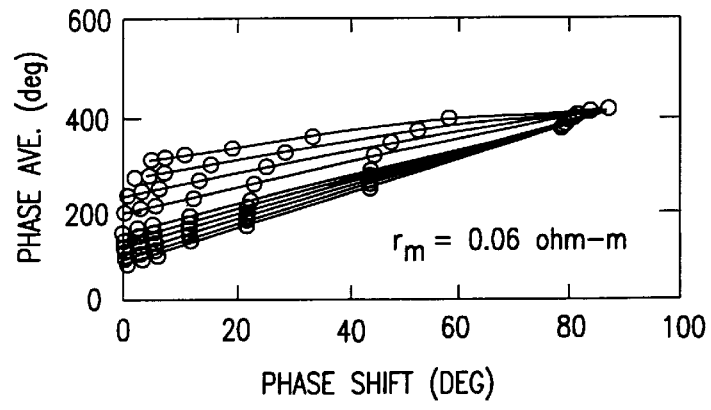
Figure 13D:
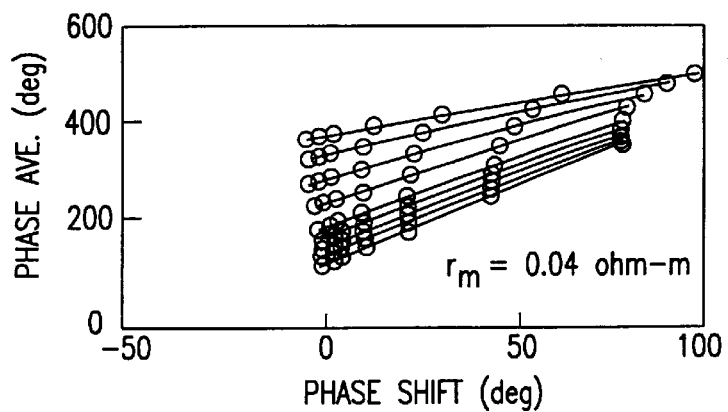
Figure 13E:
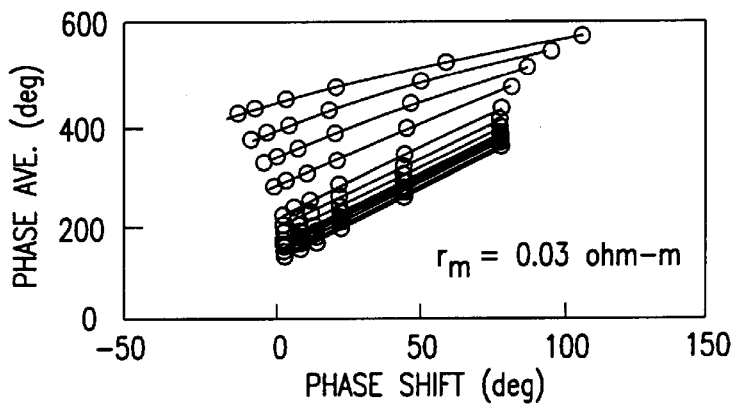
Figure 13F:
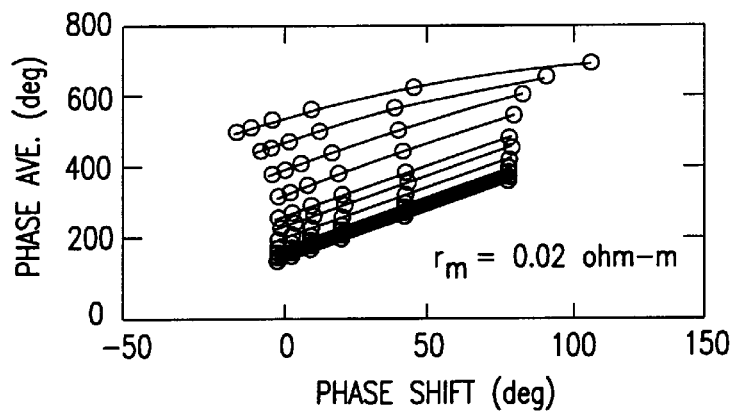

The procedure of the blocks 935 and 940 can be envisioned graphically from FIG. 12. In the step model of FIG. 11, PA, PS, and AD are each a function of $r_t$, $r_m$, HD, and TR. For a particular spacing TR and a particular downhole mud resistivity $r_m$, each of PS, PA, and AD are functions of the borehole diameter, HD, and the formation resistivity, $r_t$. That is, PS=f(HD,$r_t$)

PA=f(HD,$r_t$)

AD=f(HD,$r_t$).

Thus, for example, since PS and PA are both functions of HD and $r_t$, a plot of PA versus PS can be envisioned, for values of HD and $r_t$. An example of such a plot is illustrated in FIG. 12 (for an arbitrary TR and an arbitrary $r_m$). There are twelve curves, one for each of the respective borehole diameters, of which only seven are illustrated for clarity. On each of these curves, the $r_t$ value varies, generally with decreasing $r_t$ for increasing PS and PA. For example, in the illustration, on each HD curve, $r_t$ varies from the largest model formation resistivity (300 ohm-m) to the smallest model formation resistivity (0.1 ohm-m). The plot of FIG. 12 can be used to illustrate the interpolation represented by the blocks 935 and 940 of the FIG. 9 flow diagram. (In the illustration of FIG. 12 the curves shown are more uniform and more evenly spaced than the actual curves will generally be, for ease of graphical explanation. However, as will be seen below from actual curves based on realistic model parameters, the curves tend to be orderly and monotonic, which facilitates the described interpolation operations.) For a particular measured value of PS (that is, $PS_m$), the twelve model borehole diameters (HD) correspond to twelve values of PA, some of which are shown in FIG. 12. In the interpolation of block 940, the measured phase average $PA_m$ is used to interpolate between the PA values on either side of it to obtain an interpolated HD value between the HD values corresponding to these adjacent PA values. This HD value is called $HD_{est}(TR,r_m)$. The HD value will lie at the intersection of $PS_m$ and $PA_m$ on an interpolated HD curve, as shown in dashed line in FIG. 12.

Referring again to the flow diagram of FIG. 9, a procedure similar to that just described can be utilized to obtain an estimate of $r_t$ from phase shift measurement, $PS_m$. More specifically, as represented by the block 945, the supplemental look-up table is used to determine $r_t$ values corresponding to $PS_m$ (the measured phase shift).

FIG. 13 illustrates sets of curves (a) through (f), for a 22 inch transmitter-to-receivers spacing, for the indicated respective downhole mud resistivities, with phase average (PA), in degrees, being plotted against phase shift (PS), in degrees, in each case. The circular points represent the different $r_t$ values on each HD curve, as in FIG. 12. The sets of curves for higher mud resistivities (not shown) would be packed more tightly together, due to reduced sensitivity to lower $r_t$ to $r_m$ ratio.

Referring again to FIG. 9, the decision block 955 is then entered, this block representing determination of whether the last TR spacing has been treated. If not, the next TR spacing is utilized (block 960), the block 935 is re-entered, the values of $HD_{est}(TR,r_m)$ and $r_{t(est)}(TR,r_m)$ are determined for the current spacing, and the loop 968 is continued until all TR spacings have been treated. Then, as represented by the block 970, the variance of $r_{t(est)}(TR,r_m)$ and of $HD_{est}(TR,r_m)$ and the mean of $HD_{est}(TR,r_m)$ are computed and stored. The decision block 975 is entered, and the determination is made as to whether the last $r_m$ has been reached. If not, $r_m$ is incremented, the block 920 is re-entered, and the loop 978 is continued until all $r_m$ have been processed, so that $HD_{est}(TR,r_m)$ and $r_{t(est)}(TR,r_m)$ have now been determined and stored for all TR and all $r_m$ candidates, and, for each $r_m$, the variance of $r_{t(est)}(TR,r_m)$, the mean of $HD_{est}(TR,r_m)$, and the variance of $HD_{est}(TR,r_m)$ are computed.

In an embodiment of the invention, a selection algorithm, represented by further blocks of the flow diagram of FIG. 9, can be implemented. Starting with the previously derived candidates, the selection algorithm is used to select an $r_m$ candidate value that produces the most consistent and reasonable model parameters $HD_{est}(TR,r_m)$ and $r_{t(est)}(TR,r_m)$. These model parameters are obtained through the method described in this embodiment such that the measured data $PS_m$ and $PA_m$ very closely match to the model values. Noise in the measured data or deviation of the actual situation from the model can cause the estimated parameters, $HD_{est}(TR,r_m)$ and $r_{t(est)}(TR,r_m)$ to spread out in the parameter space and defeat the goal of a very close match. For example, the borehole diameter estimations from various TR spacings may not be the same. Instead, they will spread out into a finite range. Lower data quality and/or larger mismatch between the model and the actual situation will lead to a larger spread in the estimated parameter values. Therefore, the general strategy for this part of the present embodiment is to select the $r_m$ values that produced the smallest spread in the parameter space.

Figure 9A:
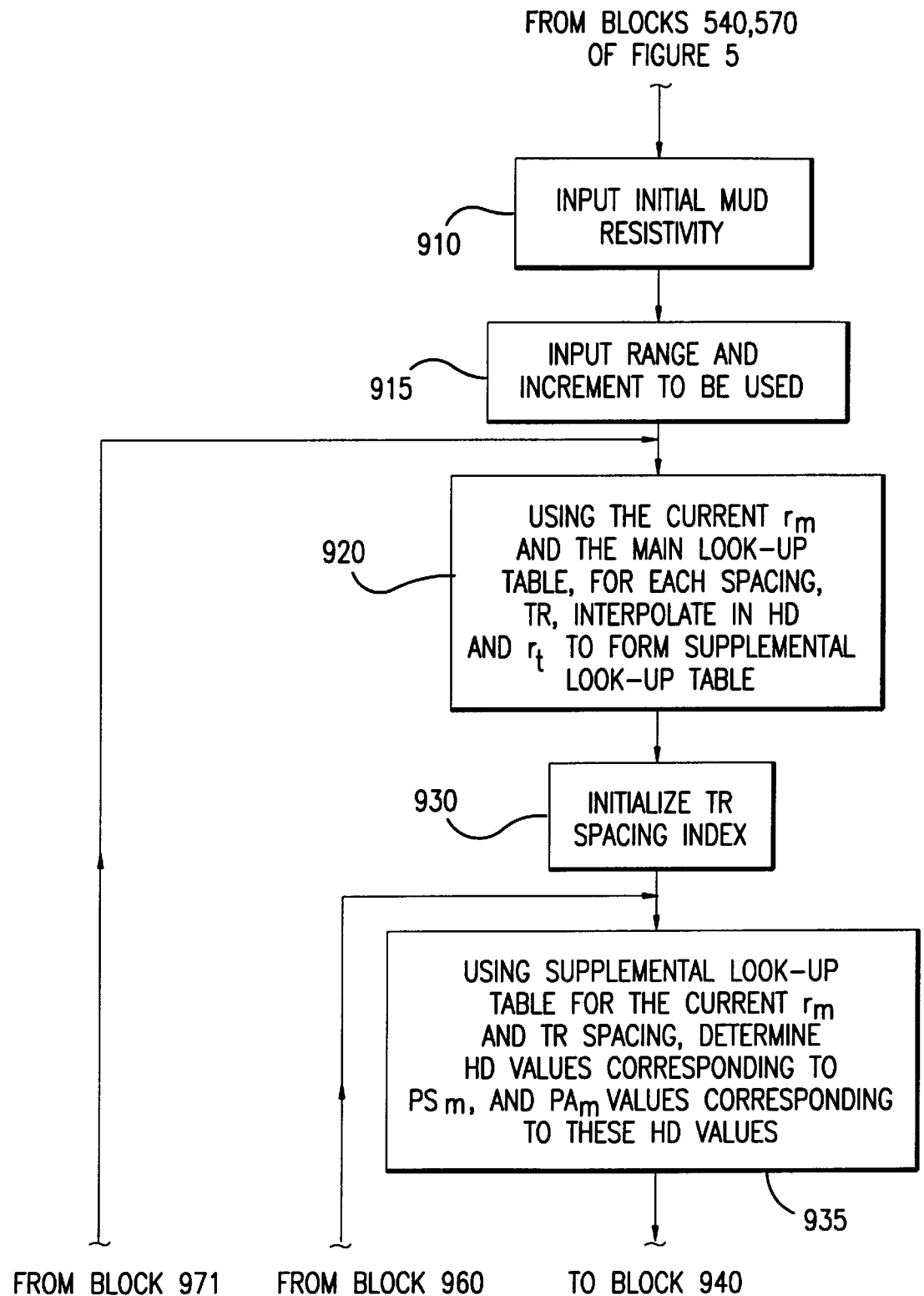
FIGS. 9A–9D, which includes FIG. 9D placed below FIG. 9C placed below FIG. 9B placed below
Figure 9B:
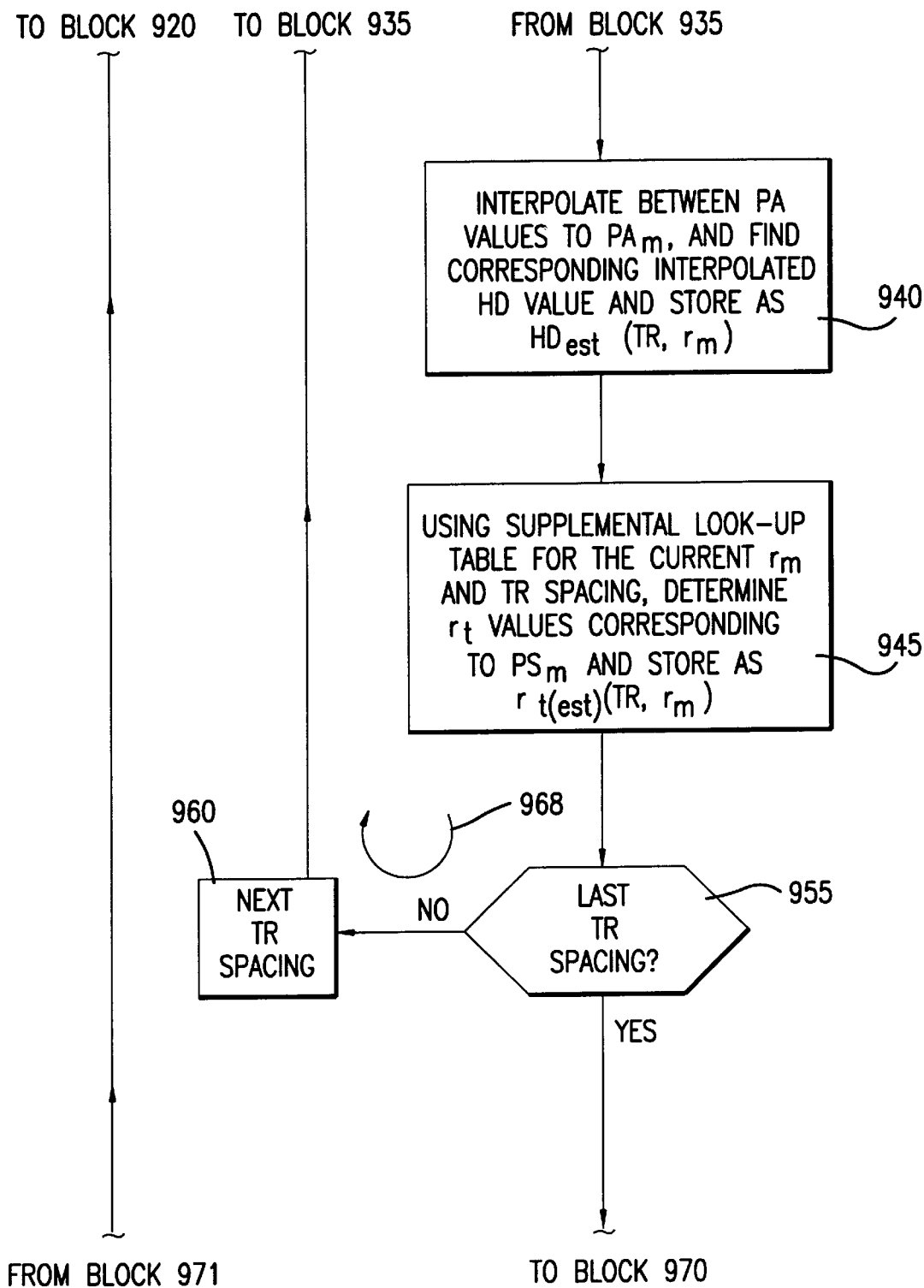
Figure 9C:
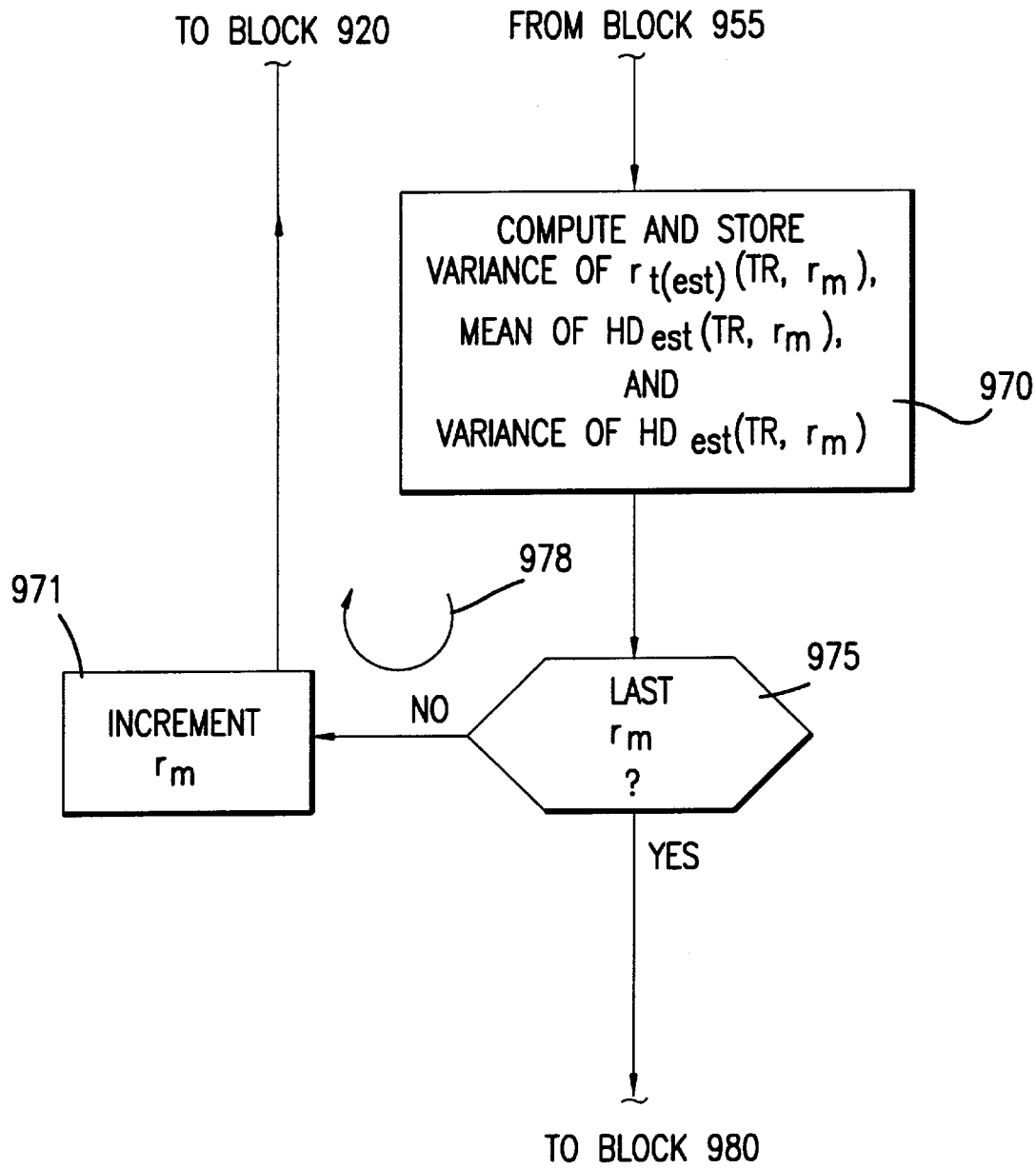
Figure 9D:
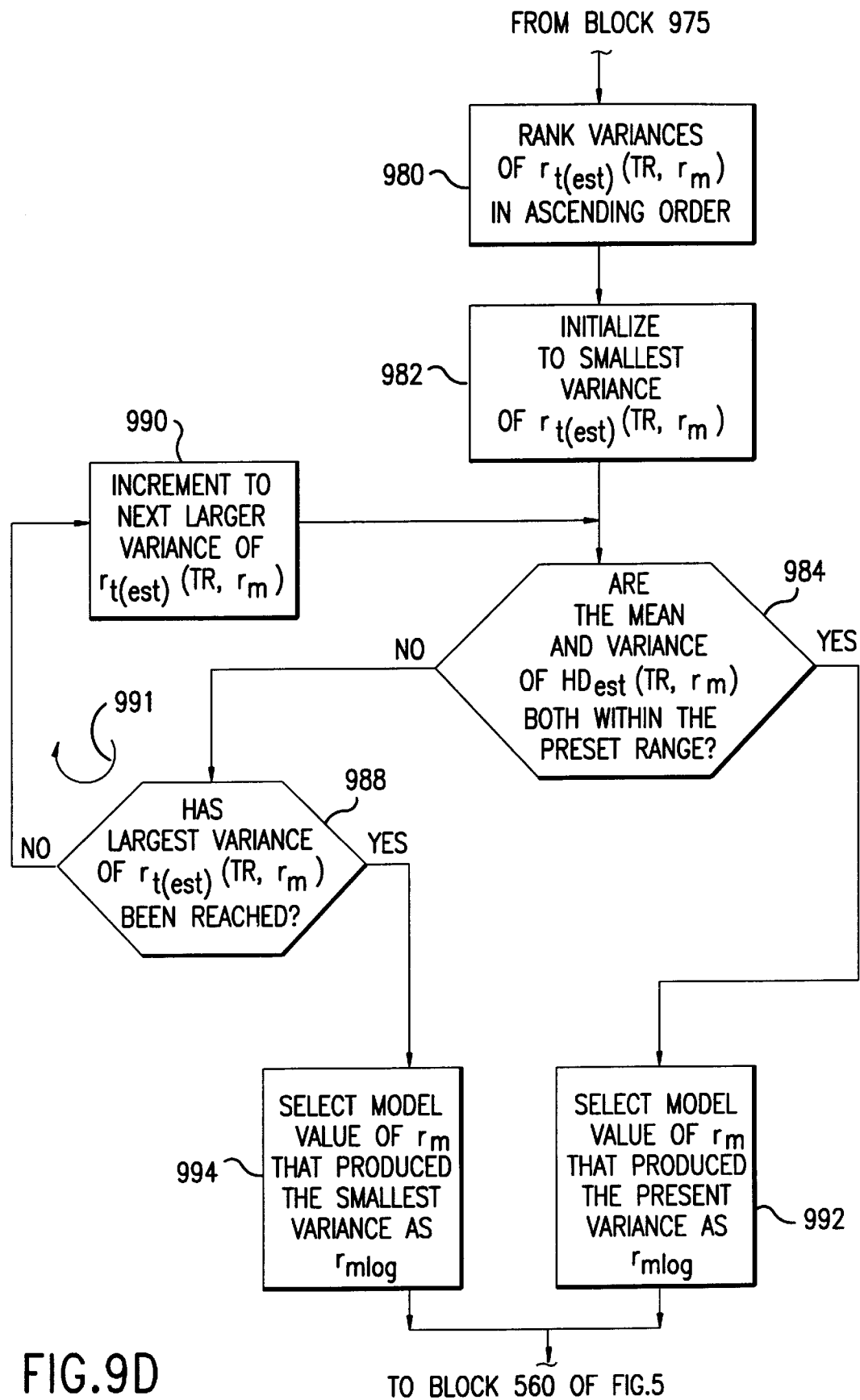

An example of a selection technique using the indicated type of approach is described in conjunction with FIG. 9D. This technique selects the $r_m$ that produces the smallest variance of $r_{t(est)}(TR,rr_m)$ and also has a mean value of $HD_{est}(TR,r_m)$ within a preset range bounded by $HD_{min}$ and $HD_{max}$, and a variance of $HD_{est}(TR,r_m)$ smaller than a preset limit, called $HD_{vlim}$. The range and bounds can be empirically determined. As one example, $HD_{min}$ can be the bit size, and $HD_{max}$ can be 16 to 18 inches, which is a relatively large borehole size for a typical 6 inch bit.

In FIG. 9D the block 980 represents the ranking of the variances (that is, the variance of $r_{t(est)}(TR,r_m)$, for each $r_m$, taken over all spacings TR) in ascending order. The block 982 is then entered, this block representing initializing to the smallest variance of the ranked variances. Determination is then made (decision block 984) as to whether the mean and variance of $HD_{est}(TR,r_m)$ are both within the preset range. If not, inquiry is made (decision block 988) as to whether the largest variance of $r_{t(est)}(TR,r_m)$ has been reached. If not, the block 990 is entered, for consideration of the next larger variance of $r_{t(est)}(TR,r_m)$ and the loop 991 continues until all the variances of $r_{t(est)}(TR,r_m)$ have been considered. When the condition of decision block 984 is met, the model value of $r_m$ that produced the smallest variance at which the mean and variance range requirements for $HD_{est}(TR,r_m)$ were also met, is selected (block 992, and called $r_{mlog}$. If, however, all variances of $r_{t(est)}(TR,r_m)$ have been considered and the condition of decision block 984 was not met, then the inquiry of decision block 988 will be answered in the affirmative, and the block 994 will be entered, this block representing selection of the model value of $r_m$ (as $r_{mlog}$) that produced the smallest variance of $r_{t(est)}(TR,r_m)$. Therefore, in summary, the routine of FIG. 9D operates to select the $r_m$ that produced the smallest variance of $r_{t(est)}(TR,r_m)$ and also met the range criteria for the mean and variance of $HD_{est}(TR,r_m)$, unless the indicated range criteria are not met for any $r_m$, in which case the routine is operative to select the $r_m$ that resulted in the smallest variance of $r_{t(est)}(TR,r_m)$. The block 560 of FIG. 5B is then entered.

Figure 10A:
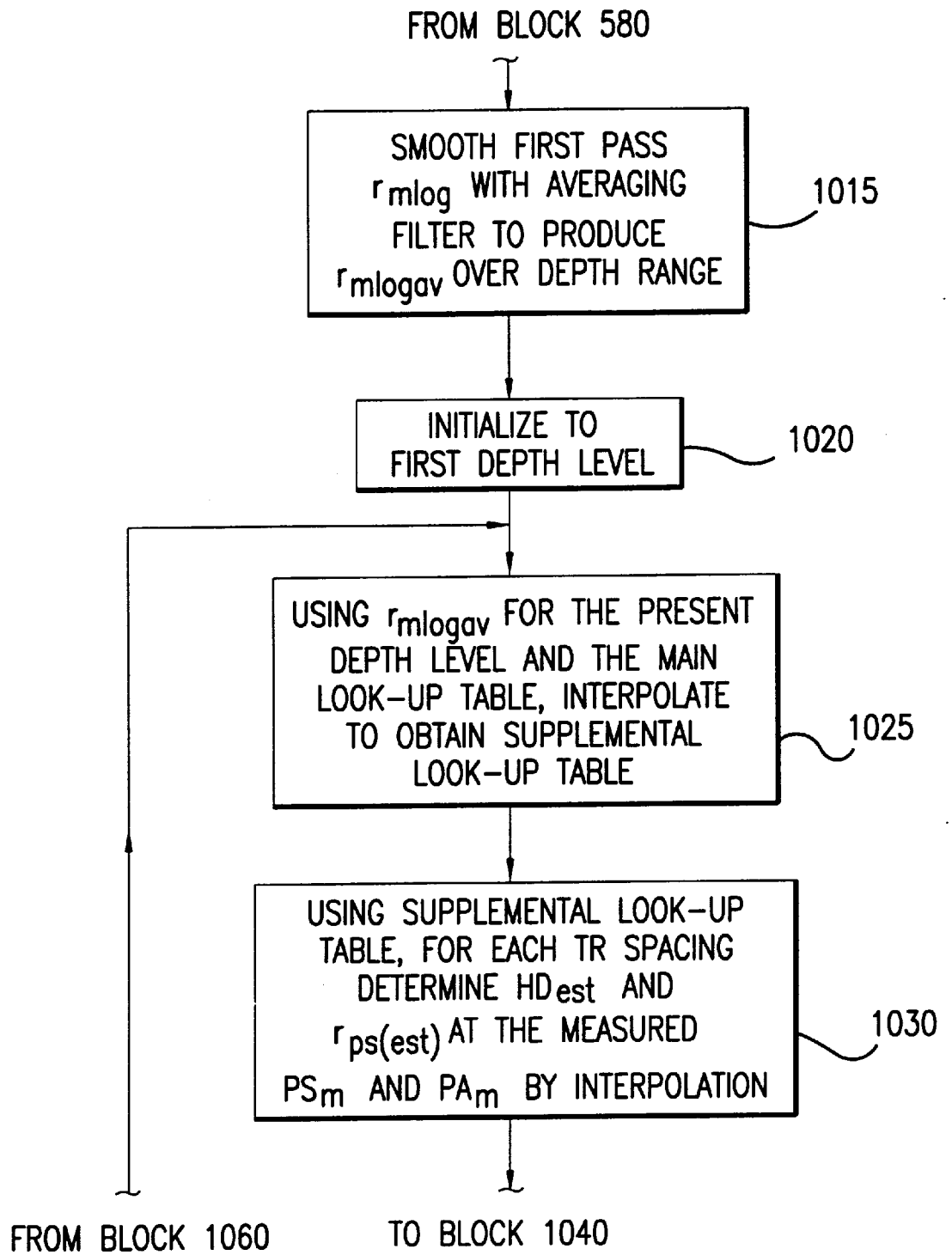
FIGS. 10A–10B, which includes FIG. 10A placed below
Figure 10B:
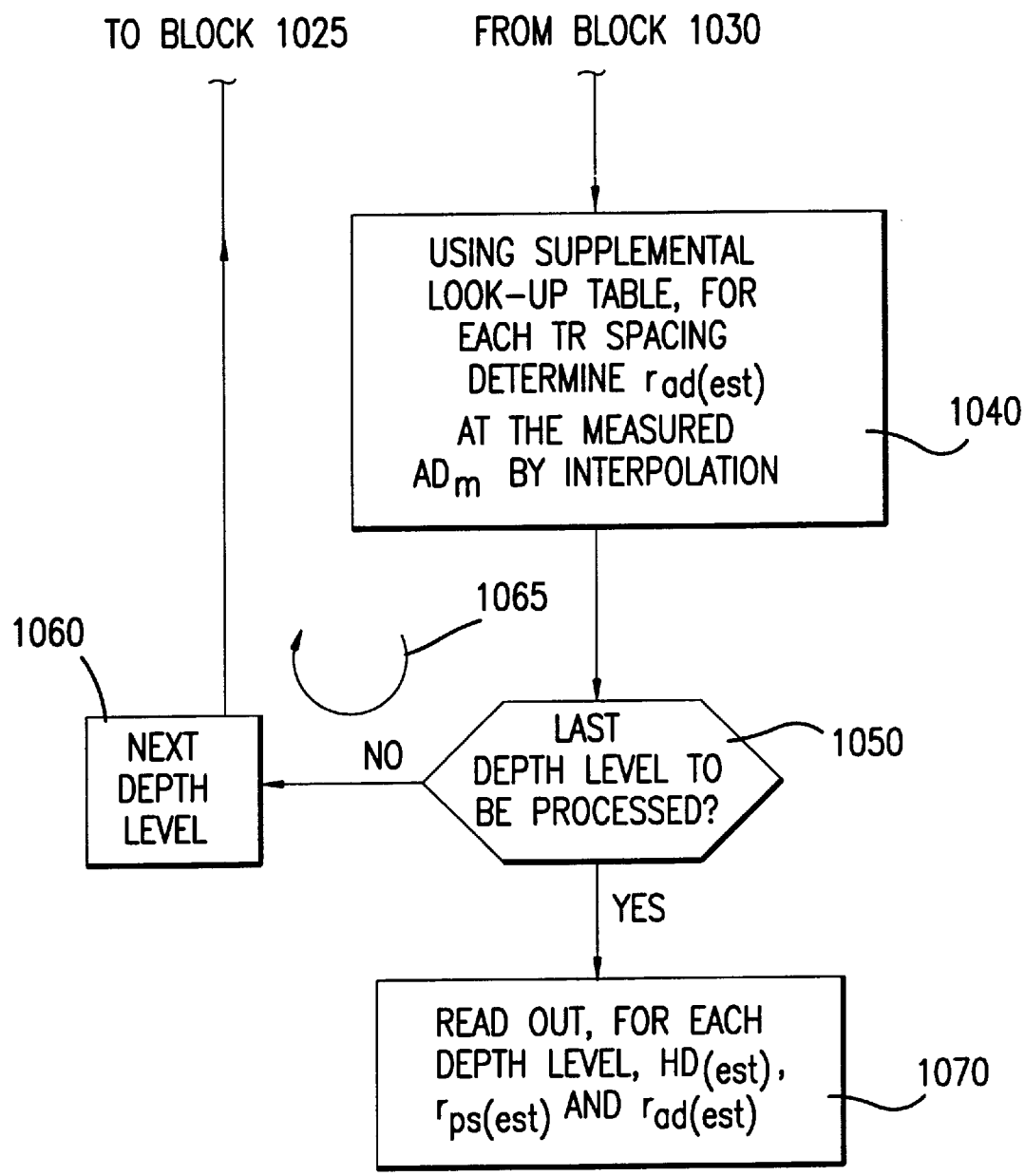

FIG. 10 illustrates the routine represented by block 590 of FIG. 5B for second pass processing. As represented by the block 1015, the values of $r_{mlog}$ can be smoothed over the depth range being processed to reflect the fact that the mud resistivity will tend to not vary quickly as a function of depth level. A suitable running averaging window of, for example, 100 to 200 depth range points (e.g. for a 6 inch depth sampling interval), can be utilized. Alternatively, a filter with unequal weightings could be used. After the smoothing with an averaging filter, the mud resistivity values are called $r_{mlogav}$. The block 1020 is then entered, this block representing initializing to the first depth level of the range being processed. A procedure similar to that previously described (see FIG. 9) is used to interpolate in the main look-up table to obtain a supplemental look-up table for $PS_{ikl}$, $PA_{ikl}$ and $AD_{ikl}$. (In this case, there is one less parameter, and no subscript j, because $r_m$ is fixed as $r_{mlogav}$.) Next, the block 1030 is entered, this block representing the determination, for each TR spacing, of a refined value of borehole diameter (designated $HD_{est}$) and borehole compensated phase shift resistivity, (designated $r_{ps(est)}$) at the measured $PS_m$ and $PA_m$. This is done by interpolation, again in the manner previously described. Then, as represented by the block 1040, and with $HD_{est}$ having been determined, for each TR spacing, borehole compensated attenuation resistivity ($r_{ad(est)}$) is determined at the measured $AD_m$ by interpolation.

Figure 14:
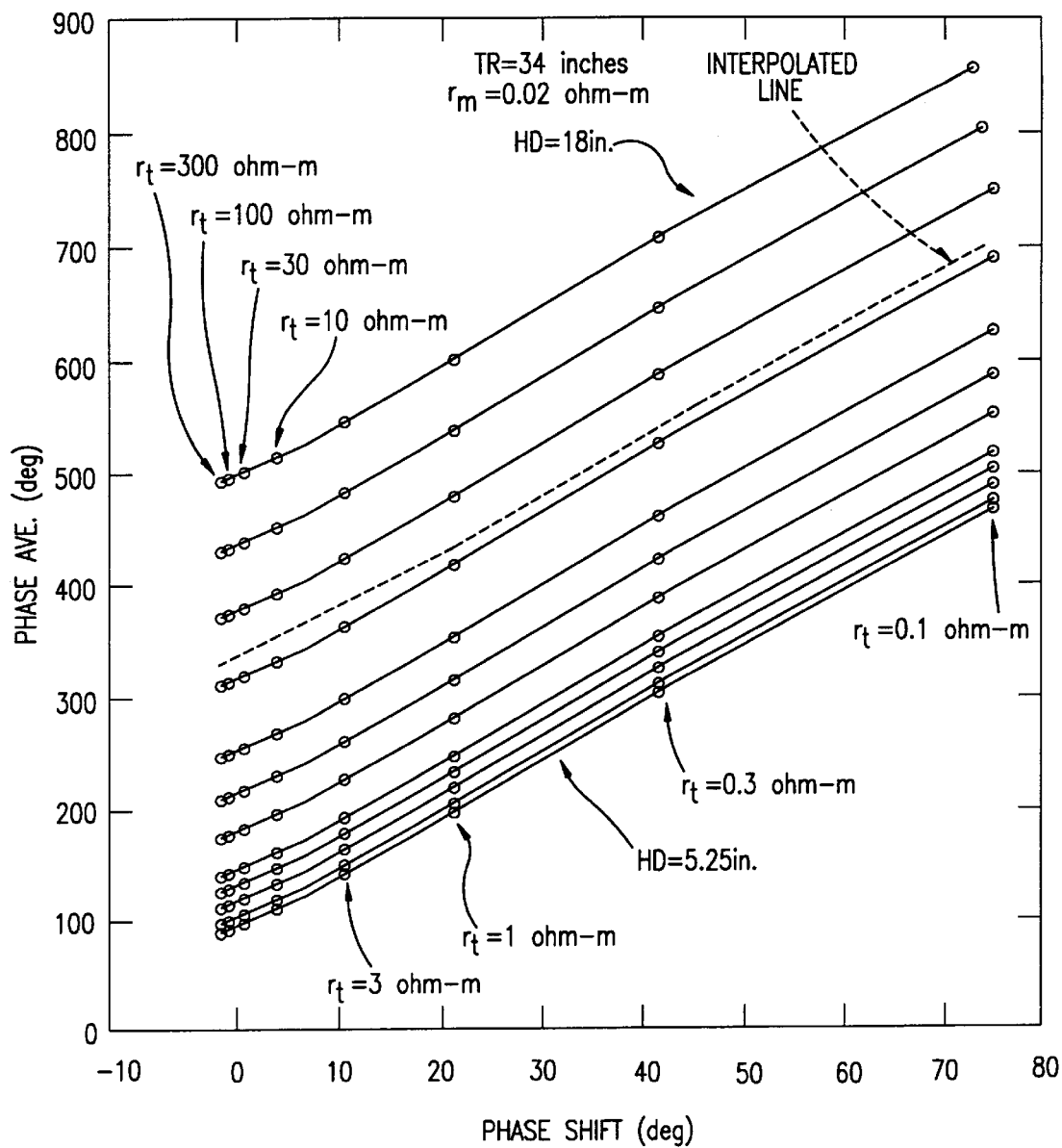
FIG. 14 is a diagram, for a particular transmitter-to-receivers spacing and a particular downhole mud resistivity, of phase average versus phase shift, for varying values of borehole diameter, that is useful in understanding operation of an embodiment of the invention.
Figure 15:
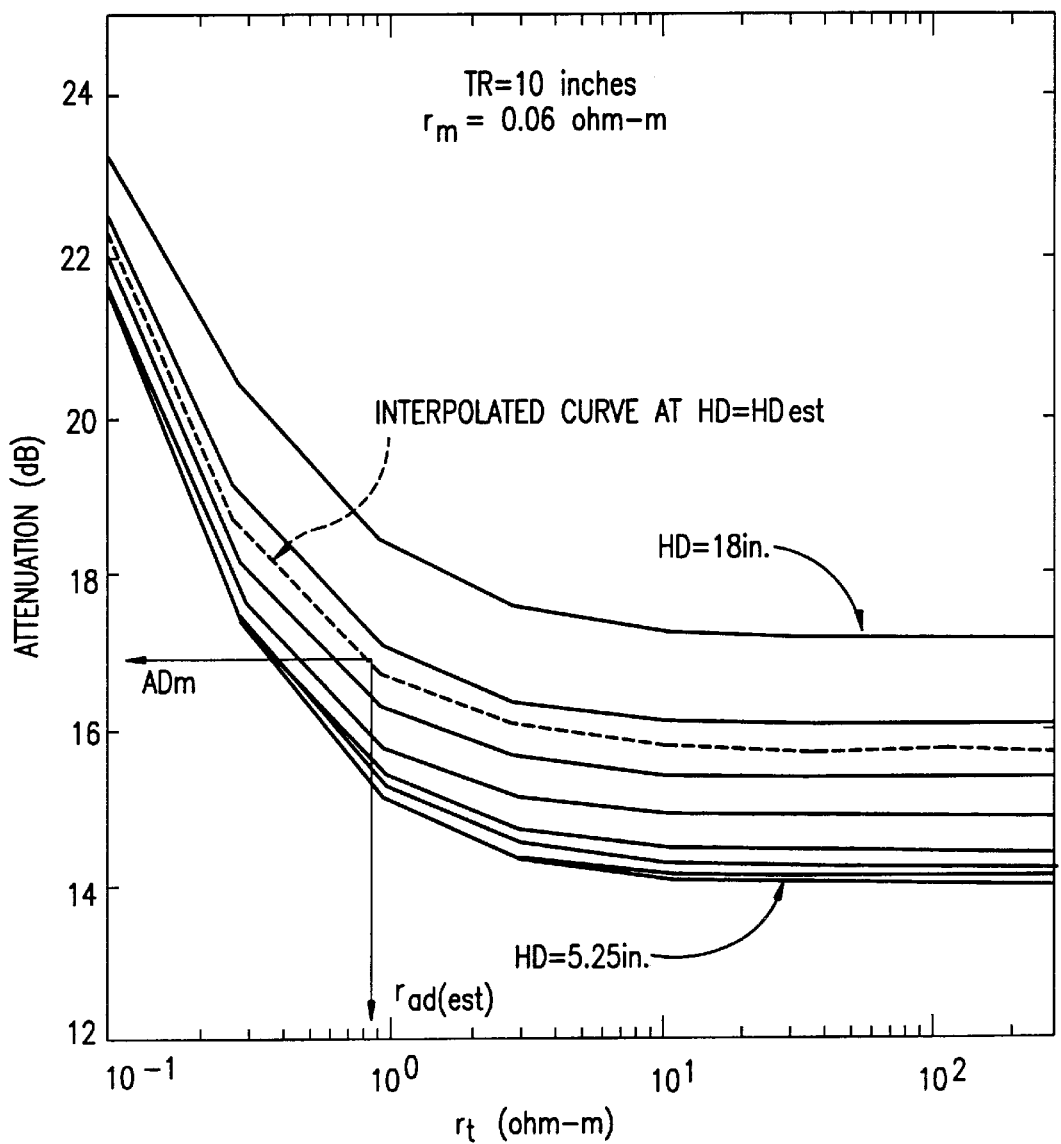
FIG. 15 is a diagram, for a particular transmitter-to-receivers spacing and a particular downhole mud resistivity, of attenuation versus borehole corrected formation resistivity, for varying values of borehole diameter, that is useful in understanding operation of an embodiment of the invention.

Graphical illustrations of exemplary interpolations are shown in FIGS. 14 and 15. In FIG. 14, the dashed line represents the interpolated $HD_{est}$, and the interpolated $r_t$ provides the interpolated $r_{ps(est)}$ at the measured $PS_m$ and $PA_m$. FIG. 15 shows the plot of $AD_{ikl}$ versus $r_t$ grid values for each HD grid point. The i, k and l indices represent $r_t$, borehole diameter and TR, respectively. For a given borehole diameter value, $HD_{est}(TR, r_{mlogav})$, an interpolated curve (the dashed line of FIG. 15) is obtained. Using the measured attenuation ($AD_m$), the corresponding borehole corrected attenuation resistivity is obtained on the dashed line through interpolation.

Referring again to FIG. 10, determination is next made (decision block 1050) as to whether the last depth level of the depth range being processed has been reached. If not, the depth level index is incremented (block 1060), the block 1025 is re-entered, and the loop 1065 is continued until all depth levels in the range of interest have been processed. Thus, in addition to a log of $r_{mlogav}$ over the depth range of interest, $HD_{est}$ (TR, $r_{mlogav}$) $r_{ps(est)}$(TR, $r_{mlogav}$), and $r_{ad(est)}$ (TR, $r_{mlogav}$) are also read out (block 1070) and are available as logs over the depth range. It will be understood that the output log values of $HD_{est}$, for each of the spacings TR, as well as the borehole compensated resistivities, for each of the spacings TR, can also be further processed, if desired. Regarding HD, the refined estimate from shortest spacing will generally be preferred, as it is most sensitive to the borehole, although the other estimates of HD can be utilized in an overall determination.

In the described embodiment, downhole mud resistivity $r_m$, borehole diameter HD, and borehole corrected resistivity $r_t$ were all initially unknowns in the process. It will be understood that, in some situations, one or two of these unknowns may be known beforehand with a reasonable degree of confidence due, for example, to local knowledge of the geology over a given range of depth levels. In such circumstance, the previously described routine can be modified to take account of the parameter that is known with a high degree of confidence. For example, assume that in a region of depth levels of interest, it is known from local knowledge that mixing of the mud with formation fluids will be insignificant, so that the mud resistivity can be well approximated with good confidence. In such case, the "known" mud resistivity can be substituted for $r_{mioqav}$ in the second pass processing, and part of the first pass processing can be bypassed. The processing time and cost may be reduced substantially as a benefit of the additional knowledge. Another example is where local knowledge indicates that the borehole size is likely in gauge, so that bit size (BTS) will be a good approximation of the borehole diameter. In such case, the technique of block 1030 can then be replaced with one similar to that of block 1040, except using $PS_{ikl}$ in place of $AD_{ikl}$ and BTS in place of $HD_{est}$. In this example, BTS would also replace $HD_{est}$ in the block 1040.

We claim:

1. A method for determining the downhole borehole fluid resistivity, borehole diameter, and borehole corrected formation resistivity of formations surrounding an earth borehole, comprising the steps of:

(a) suspending a logging device in the borehole;

(b) transmitting electromagnetic energy from a transmitter location on the logging device, receiving the transmitted electromagnetic energy at receiver locations on the logging device, and measuring the phase and amplitude of the received electromagnetic energy for a first transmitter-to-receivers spacing associated with said transmitter and receiver locations;

(c) determining, from the phase and amplitude measured at the receivers, a phase shift $PS_m$, a phase average $PA_m$, and an attenuation $AD_m$ associated with said first transmitter-to-receivers spacing;

(d) repeating steps (b) and (c) for a plurality of further transmitter-to-receivers spacings to obtain $PS_m$, $PA_m$, and $AD_m$ for said plurality of further transmitter-to-receivers spacings;

(e) generating a formation and borehole model having model values of borehole diameter HD, borehole fluid resistivity $r_m$, and borehole corrected formation resistivity $r_t$;

(f) selecting values of HD, $r_m$ and $r_t$ that would produce a model phase shift PS, a model average phase PA, and a model attenuation AD that substantially correspond, for each of said transmitter-to-receiver spacings, with the respective measured $PS_m$, $PA_m$ and $AD_m$ for the respective transmitter-to-receivers spacing; and (g) outputting the selected model values of HD, $r_m$ and $r_t$.

2. The method as defined by claim 1, wherein said selecting step (f) comprises varying trial values of HD, $r_m$, and $r_t$, and selecting a combination of trial values that produces correspondence of PS, PA and AD with $PS_m$, $PA_m$ and $AD_m$ at the respective transmitter-to-receivers spacings.

3. The method as defined by claim 2, wherein said steps (e) and (f) include:

generating, for each of said transmitter-to-receivers spacings, look-up tables between HD, $r_m$, $r_t$ and PS, PA, AD, and deriving said selected model values from said look-up tables and from $PS_m$, $PA_m$ and $AD_m$.

4. The method as defined by claim 2, wherein said steps (e) and (f) include:

(h) generating, for each of said transmitter-to-receivers spacings, look-up tables between HD, $r_m$, $r_t$ and PS, PA, AD;

(i) selecting a trial value of $r_m$;

(j) interpolating in each of said look-up tables to obtain, for the particular transmitter-to-receivers spacing, and for the current trial value of $r_m$, respective subsidiary look-up tables defining, for the respective transmitter-to-receivers spacings, PS as a function of (HD, $r_t$), PA as a function of (HD, $r_t$), and AD as a function of (HD, $r_t$);

(k) deriving, from the subsidiary look-up tables for the respective transmitter-to-receivers spacings and the measured values $PS_m$, $PA_m$, and $AD_m$ for the respective transmitter-to-receivers spacings, an estimate of borehole diameter $HD_{est}$, and an estimate of the borehole corrected formation resistivity $r_{t(est)}$;

(l) repeating steps (j) and (k) for other trial values of $r_m$, to obtain $HD_{est}$ and $r_{t(est)}$ for the respective transmitter-to-receivers spacings for each trial value of $r_m$; and (m) choosing one of the trial values of $r_m$ as the selected model value of $r_m$ based on the $HD_{est}$ and $r_{t(est)}$ values resulting therefrom.

5. The method as defined by claim 4, further comprising repeating said determination of downhole borehole fluid resistivity, borehole diameter, and borehole corrected formation resistivity at other depth level positions of said logging device in said borehole.

6. The method as defined by claim 5, wherein said selected model value of $r_m$ is smoothed by averaging with the model values of $r_m$ at adjacent depth levels in the borehole.

7. The method as defined by claim 6, further comprising, after selecting the model value of $r_m$, and varying trial values of HD and $r_t$ for each of the respective transmitter-to-receivers spacings, selecting a combination of trial values of HD and $r_t$ that produces correspondence of PS, PA and AD with $PS_m$, $PA_m$ and $AD_m$ at the respective transmitter-to-receivers spacings.

8. The method as defined by claim 4, further comprising, after selecting the model value of $r_m$, and varying trial values of HD and $r_t$ for each of the respective transmitter-to-receivers spacings, selecting a combination of trial values of HD and $r_t$ that produces correspondence of PS, PA and AD with $PS_m$, $PA_m$ and $AD_m$ at the respective transmitter-to-receivers spacings.

9. The method as defined by claim 4, wherein said step of choosing one of the trial values of $r_m$ comprises determining, for each trial value of $r_m$, the variance of at least one of $r_{t(est)}$ and $HD_{est}$ for each transmitter-to-receivers spacings, and choosing said one of the trial values of $r_m$ based on the determined variances.

10. The method as defined by claim 2, wherein said step of suspending a logging device in the borehole comprises coupling a logging-while-drilling device in a drill string in the borehole.

11. The method as defined by claim 1, wherein said steps (e) and (f) include:

generating, for each of said transmitter-to-receivers spacings, look-up tables between HD, $r_m$, $r_t$ and PS, PA, $AD_m$ and deriving said selected model values from said look-up tables and from $PS_m$, $PA_m$ and $AD_m$.

12. The method as defined by claim 1, wherein said steps (e) and (f) include:

(h) generating, for each of said transmitter-to-receivers spacings, look-up tables between HD, $r_m$, $r_t$ and PS, PA, AD;

(i) selecting a trial value of $r_m$;

(j) interpolating in each of said look-up tables to obtain, for the particular transmitter-to-receivers spacing, and for the current trial value of $r_m$, respective subsidiary look-up tables defining, for the respective transmitter-to-receivers spacings, PS as a function of (HD, $r_t$), PA as a function of (HD, $r_t$), and AD as a function of (HD, $r_t$);

(k) deriving, from the subsidiary look-up tables for the respective transmitter-to-receivers spacings and the measured values $PS_m$, $PA_m$, and $AD_m$ for the respective transmitter-to-receivers spacings, an estimate of borehole diameter $HD_{est}$, and an estimate of the borehole corrected formation resistivity $r_{t(est)}$;

(l) repeating steps (j) and (k) for other trial values of $r_m$, to obtain $HD_{est}$ and $r_{t(est)}$ for the respective transmitter-to-receivers spacings for each trial value of $r_m$; and (m) choosing one of the trial values of $r_m$ as the selected model value of $r_m$ based on the $HD_{est}$ and $r_{t(est)}$ values resulting therefrom.

13. The method as defined by claim 12, further comprising repeating said determination of downhole borehole fluid resistivity, borehole diameter, and borehole corrected formation resistivity at other depth level positions of said logging device in said borehole.

14. The method as defined by claim 13, wherein said selected model value of $r_m$ is smoothed by averaging with the model values of $r_m$ at adjacent depth levels in the borehole.

15. The method as defined by claim 14, further comprising, after selecting the model value of $r_m$, and varying trial values of HD and $r_t$ for each of the respective transmitter-to-receivers spacings, selecting a combination of trial values of HD and $r_t$ that produces correspondence of PS, PA and AD with $PS_m$, $PA_m$ and $AD_m$ at the respective transmitter-to-receivers spacings.

16. The method as defined by claim 12, wherein said step of suspending a logging device in the borehole comprises coupling a logging-while-drilling device in a drill string in the borehole.

17. The method as defined by claim 1, further comprising repeating said determination of downhole borehole fluid resistivity, borehole diameter, and borehole corrected formation resistivity at other depth level positions of said logging device in said borehole.

18. The method as defined by claim 17, wherein said selected model value of $r_m$ is smoothed by averaging with the model values of $r_m$ at adjacent depth levels in the borehole.

19. The method as defined by claim 1, wherein said step of suspending a logging device in the borehole comprises coupling a logging-while-drilling device in a drill string in the borehole.

20. A method for determining at least one of the downhole borehole fluid resistivity, borehole diameter, and borehole corrected formation resistivity of formations surrounding an earth borehole, comprising the steps of:

(a) suspending a logging device in the borehole;

(b) transmitting electromagnetic energy from a transmitter location on the logging device, receiving the transmitted electromagnetic energy at receiver locations on the logging device, and measuring the phase and amplitude of the received electromagnetic energy for a first transmitter-to-receivers spacing associated with said transmitter and receiver locations;

(c) determining, from the phase and amplitude measured at the receivers, a phase shift $PS_m$, a phase average $PA_m$, and an attenuation $AD_m$ associated with said first transmitter-to-receivers spacing;

(d) repeating steps (b) and (c) for a plurality of further transmitter-to-receivers spacings to obtain $PS_m$, $PA_m$, and $AD_m$ for said plurality of further transmitter-to-receivers spacings;

(e) generating a formation and borehole model having model values of borehole diameter HD, borehole fluid resistivity $r_m$, and borehole corrected formation resistivity $r_t$;

(f) selecting values of HD, $r_m$ and $r_t$ that would produce a model phase shift PS, a model average phase PA, and a model attenuation AD that substantially correspond, for each of said transmitter-to-receiver spacings, with the respective measured $PS_m$, $PA_m$ and $AD_m$ for the respective transmitter-to-receivers spacing; and (g) outputting the selected model values of at least one of HD, $r_m$ and $r_t$.

21. The method as defined by claim 20, wherein said step of suspending a logging device in the borehole comprises coupling a logging-while-drilling device in a drill string in the borehole.

22. The method as defined by claim 21, wherein said steps (e) and (f) include:

generating, for each of said transmitter-to-receivers spacings, look-up tables between at least two of HD, $r_m$, $r_t$ and PS, PA, AD, and deriving said selected model values from said look-up tables and from $PS_m$, $PA_m$ and $AD_m$.

23. The method as defined by claim 21, wherein said steps (e) and (f) include:

(h) generating, for each of said transmitter-to-receivers spacings, look-up tables between HD, $r_m$, $r_t$ and PS, PA, AD;

(i) selecting a trial value of one of HD, $r_m$ or $r_t$;

(j) interpolating in each of said look-up tables to obtain, for the particular transmitter-to-receivers spacing, and for the current trial value, respective subsidiary look-up tables defining, for the respective transmitter-to-receivers spacings, PS, PA, and $AD_m$ each as a function of the two among (HD, $r_m$, $r_t$) that are not the one selected for trial value;

(k) deriving, from the subsidiary look-up tables for the respective transmitter-to-receivers spacings and the measured values $PS_m$, $PA_m$, and $AD_m$ for the respective transmitter-to-receivers spacings, an estimate of two among (HD, $r_m$, $r_t$) that are not selected for trial value;

(l) repeating steps (j) and (k) for other trial values of said one of HD, $r_m$ or $r_t$; and (m) choosing one of the trial values of said one of HD, $r_m$ or $r_t$ as the selected model value based on the estimated values resulting therefrom.

24. The method as defined by claim 20, wherein said at least one of said downhole borehole fluid resistivity, borehole diameter, and borehole corrected formation resistivity comprises downhole borehole fluid resistivity.

25. The method as defined by claim 20, wherein said at least one of said downhole borehole fluid resistivity, borehole diameter, and borehole corrected formation resistivity comprises borehole diameter.

26. The method as defined by claim 20, wherein said at least one of said downhole borehole fluid resistivity, borehole diameter, and borehole corrected formation resistivity comprises borehole corrected formation resistivity.

27. The method as defined by claim 20, wherein said selecting step (f) comprises varying trial values of at least two of HD, $r_m$, and $r_t$, and selecting a combination of trial values that produces correspondence of PS, PA and AD with $PS_m$, $PA_m$ and $AD_m$ at the respective transmitter-to-receivers spacings.

28. The method as defined by claim 20, wherein said steps (e) and (f) include:

generating, for each of said transmitter-to-receivers spacings, look-up tables between at least two of HD, $r_m$, $r_t$ and PS, PA, AD, and deriving said selected model values from said look-up tables and from $PS_m$, $PA_m$ and $AD_m$.

29. The method as defined by claim 20, wherein said steps (e) and (f) include:

(h) generating, for each of said transmitter-to-receivers spacings, look-up tables between HD, $r_m$, $r_t$ and PS, PA, AD;

(i) selecting a trial value of one of HD, $r_m$ or $r_t$;

(j) interpolating in each of said look-up tables to obtain, for the particular transmitter-to-receivers spacing, and for the current trial value, respective subsidiary look-up tables defining, for the respective transmitter-to-receivers spacings, PS, PA, and AD, each as a function of the two among (HD, $r_m$, $r_t$) that are not the one selected for trial value;

(k) deriving, from the subsidiary look-up tables for the respective transmitter-to-receivers spacings and the measured values $PS_m$, $PA_m$, and $AD_m$ for the respective transmitter-to-receivers spacings, an estimate of two among (HD, $r_m$, $r_t$) that are not selected for trial value;

(l) repeating steps (j) and (k) for other trial values of said one of HD, $r_m$ or $r_t$; and (m) choosing one of the trial values of said one of HD, $r_m$ or $r_t$ as the selected model value based on the estimated values resulting therefrom.

30. The method as defined by claim 20, further comprising repeating said determination of downhole borehole fluid resistivity, borehole diameter, and borehole corrected formation resistivity at other depth level positions of said logging device in said borehole.

31. A method for determining at least one of the downhole borehole fluid resistivity, borehole diameter, and borehole corrected formation resistivity of formations surrounding an earth borehole, comprising the steps of:

(a) suspending a logging device in the borehole;

(b) transmitting electromagnetic energy from a transmitter location on the logging device, and receiving the transmitted electromagnetic energy at receiver locations on the logging device for a first transmitter-to-receivers spacing associated with said transmitter and receiver locations;

(c) determining, from the received electromagnetic energy, measurement characteristics associated with said first transmitter-to-receivers spacing;

(d) repeating steps (b) and (c) for a plurality of further transmitter-to-receivers spacings to obtain measurement characteristics for said plurality of further transmitter-to-receivers spacings;

(e) generating a formation and borehole model having model values of borehole diameter HD, borehole fluid resistivity $r_m$, and borehole corrected formation resistivity $r_t$;

(f) selecting values of HD, $r_m$ and $r_t$ that would produce model measurement characteristics that substantially correspond, for each of said transmitter-to-receiver spacings, with the actual measurement characteristics for the respective transmitter-to-receivers spacing; and (g) outputting the selected model values of at least one of HD, $r_m$ and $r_t$.

32. The method as defined by claim 31, further comprising outputting the selected model value of HD.

33. The method as defined by claim 31, further comprising outputting the selected model value of $r_t$.

34. The method as defined by claim 31, further comprising outputting the selected model values of HD and $r_t$.

35. The method as defined by claim 34, wherein said step of suspending a logging device in the borehole comprises coupling a logging-while-drilling device in a drill string in the borehole.

36. The method as defined by claim 31, wherein said selecting step (f) comprises varying trial values of HD, $r_m$, and $r_t$, and selecting a combination of trial values that produces correspondence of the model measurement characteristics and the actual measurement characteristics at the respective transmitter-to-receivers spacings.

37. The method as defined by claim 31, wherein said steps (e) and (f) include:

generating, for each of said transmitter-to-receivers spacings, look-up tables between HD, $r_m$, $r_t$ and the model measurement characteristics, and deriving said selected model values from said look-up tables and from the actual measurement characteristics.

38. The method as defined by claim 31, further comprising repeating said determination of at least one of the downhole borehole fluid resistivity, borehole diameter, and borehole corrected formation resistivity at other depth level positions of said logging device in said borehole to obtain a log.

39. A method for determining the downhole borehole fluid resistivity in an earth borehole, comprising the steps of:

(a) suspending a logging device in the borehole;

(b) transmitting electromagnetic energy from a transmitter location on the logging device, and receiving the transmitted electromagnetic energy at receiver locations on the logging device, and measuring electromagnetic energy for a first transmitter-to-receivers spacing associated with said transmitter and receiver locations;

(c) determining, from the received electromagnetic energy, measurement characteristics associated with said first transmitter-to-receivers spacing;

(d) repeating steps (b) and (c) for a plurality of further transmitter-to-receivers spacings to obtain measurement characteristics for said plurality of further transmitter-to-receivers spacings;

(e) generating a formation and borehole model having model values of borehole diameter HD, borehole fluid resistivity $r_m$, and borehole corrected formation resistivity $r_t$;

(f) selecting values of HD, $r_m$ and $r_t$ that would produce model measurement characteristics that substantially correspond, for each of said transmitter-to-receiver spacings, with the actual measurement characteristics for the respective transmitter-to-receivers spacing; and (g) outputting the selected model values of $r_m$.

40. The method as defined by claim 39, further comprising repeating said determination of downhole borehole fluid resistivity at other depth level positions of said logging device in said borehole to obtain a log.

41. The method as defined by claim 40, wherein said selected model value of $r_m$ is smoothed by averaging with the model values of $r_m$ at adjacent depth levels in the borehole.

42. The method as defined by claim 41, further comprising utilizing the determined borehole fluid resistivity to select modified model values of HD and $r_t$, to obtain logs thereof.

43. The method as defined by claim 40, further comprising utilizing the determined borehole fluid resistivity to select modified model values of HD and $r_t$, to obtain logs thereof.

44. Apparatus for determining the downhole borehole fluid resistivity, borehole diameter, and borehole corrected formation resistivity of formations surrounding an earth borehole, comprising:

(a) a logging device suspendible in the borehole;

(b) means for transmitting electromagnetic energy from a transmitter location on the logging device, receiving the transmitted electromagnetic energy at receiver locations on the logging device, and measuring the phase and amplitude of the received electromagnetic energy for a first transmitter-to-receivers spacing associated with said transmitter and receiver locations;

(c) means for determining, from the phase and amplitude measured at the receivers, a phase shift $PS_m$, a phase average $PA_m$, and an attenuation $AD_m$ associated with said first transmitter-to-receivers spacing;

(d) means for repeating operation of the elements (b) and (c) for a plurality of further transmitter-to-receivers spacings to obtain $PS_m$, $PA_m$, and $AD_m$ for said plurality of further transmitter-to-receivers spacings;

(e) means for generating a formation and borehole model having model values of borehole diameter HD, borehole fluid resistivity $r_m$, and borehole corrected formation resistivity $r_t$;

(f) means for selecting values of HD, $r_m$ and $r_t$ that would produce a model phase shift PS, a model phase average PA, and a model attenuation AD that substantially correspond, for each of said transmitter-to-receiver spacings, with the respective measured $PS_m$, $PA_m$ and $AD_m$ for the respective transmitter-to-receivers spacing.

45. Apparatus as defined by claim 44, wherein said element (f) comprises means for varying trial values of HD, $r_m$, and $r_t$, and selecting a combination of trial values that produces correspondence of PS, PA, and AD with $PS_m$, $PA_m$, and $AD_m$ at the respective transmitter-to-receivers spacings.

46. Apparatus as defined by claim 44, wherein said elements (e) and (f) include:

means for generating, for each of said transmitter-to-receivers spacings, look-up tables between HD, $r_m$, $r_t$ and PS, PA, AD, and deriving said selected model values from said look-up tables and from $PS_m$, $PA_m$ and $AD_m$.

47. Apparatus as defined by claim 44, wherein said elements (e) and (f) include:

(h) means for generating, for each of said transmitter-to-receivers spacings, look-up tables between HD, $r_m$, $r_t$ and PS, PA, AD;

(i) means for selecting a trial value of $r_m$;

(j) means for interpolating in each of said look-up tables to obtain, for the particular transmitter-to-receivers spacing, and for the current trial value of $r_m$, respective subsidiary look-up tables defining, for the respective transmitter-to-receivers spacings, PS as a function of (HD, $r_t$), PA as a function of (HD, $r_t$), and AD as a function of (HD, $r_t$);

(k) means for deriving, from the subsidiary look-up tables for the respective transmitter-to-receivers spacings and the measured values $PS_m$, $PA_m$, and $AD_m$ for the respective transmitter-to-receivers spacings, an estimate of borehole diameter $HD_{est}$, and an estimate of the borehole corrected formation resistivity $r_{t(est)}$;

(l) means for repeating the operations of elements (j) and (k) for other trial values of $r_m$, to obtain $HD_{est}$ and $r_{t(est)}$ for the respective transmitter-to-receivers spacings for each trial value of $r_m$; and (m) means for choosing one of the trial values of $r_m$ as the selected model value of $r_m$ based on the $HD_{est}$ and $r_{t(est)}$ values resulting therefrom.

* * * * *